United States Patent
Crane

(10) Patent No.: US 9,184,003 B2
(45) Date of Patent: Nov. 10, 2015

(54) CIRCUIT BREAKERS

(71) Applicant: GE Energy Power Conversion Technology Ltd, Rugby, Warwickshire (GB)

(72) Inventor: Allan Crane, Trawsfynydd Gwynedd (GB)

(73) Assignee: GE Energy Power Conversion Technology Ltd. (GB)

(*) Notice: Subject to any disclaimer, the term of this patent is extended or adjusted under 35 U.S.C. 154(b) by 121 days.

(21) Appl. No.: 14/028,701

(22) Filed: Sep. 17, 2013

(65) Prior Publication Data

US 2014/0078622 A1   Mar. 20, 2014

(30) Foreign Application Priority Data

Sep. 17, 2012  (EP) .................................... 12184699

(51) Int. Cl.
*H02H 3/00*  (2006.01)
*H01H 33/59*  (2006.01)
*H02H 3/087*  (2006.01)

(52) U.S. Cl.
CPC ............. *H01H 33/596* (2013.01); *H02H 3/087* (2013.01)

(58) Field of Classification Search
CPC .................................................. H01H 33/596
USPC ............................................................ 361/8
See application file for complete search history.

(56) References Cited

U.S. PATENT DOCUMENTS

| 3,651,374 | A |   | 3/1972 | Faust |
| 4,514,607 | A | * | 4/1985 | Lloyd et al. ..................... 218/99 |
| 4,723,187 | A | * | 2/1988 | Howell ............................ 361/13 |
| 2009/0201617 | A1 |   | 8/2009 | Yamaguchi |

FOREIGN PATENT DOCUMENTS

| EP | 0092207 | A2 | 10/1983 |
| EP | 0666581 | A1 | 8/1995 |

OTHER PUBLICATIONS

European Search Report and Written Opinion issued in connection with corresponding EP Application No. 12184699.2-1806 on Jun. 4, 2014.

* cited by examiner

*Primary Examiner* — Thienvu Tran
*Assistant Examiner* — Tien Mai
(74) *Attorney, Agent, or Firm* — GE Global Patent Operation; Catherine J. Toppin

(57) ABSTRACT

A circuit breaker comprising a first dc line electrically connectable to first incoming and first outgoing dc lines, wherein the first dc line comprises a first fault-interrupting switch contact system and a first switching aid network. The first switching aid network comprises first and second rectifier strings, wherein each rectifier string comprises one or more series connected reverse blocking power electronic devices that define a first H-bridge rectifier. The first switching aid network further comprises a snubber string, the snubber string comprising at least one series connected power electronic devices capable of being turned on by gate control and a capacitor. The first switching aid network further comprises a pre-charge string comprising at least one series connected power electronic devices capable of being turned on by gate control and a resistor, and a surge arrester connected between the first and second dc output terminals of the first H-bridge rectifier.

15 Claims, 7 Drawing Sheets

CIRCUIT BREAKERS

TECHNICAL FIELD

The present invention relates to circuit breakers, and in particular to high voltage direct current (HVDC) circuit breakers or switchgear that can be used in point-to-point and multi-terminal HVDC power collection, transmission and distribution networks.

BACKGROUND OF THE INVENTION

At present, there are no known circuit breaker switch contact systems that can interrupt high levels of direct current and then immediately withstand a high re-applied high dc voltage between contacts. It is known for circuit breaker switch contact systems to be able to carry high levels of direct current and to be able to block high direct current (dc) voltage but not for such circuit breaker switch contact systems to transit from the former to the latter state.

Line commutated static power converter (LCC) based HVDC transmission networks are known and any requirement to interrupt direct current in the HVDC transmission line under normal load and fault current circumstances has typically been provided by two means. First, by phase control of the LCC rectifier at the power transmitting end of the transmission line. Second, by using heating, ventilation, and air conditioning (HVAC) switchgear to interrupt the ac supply to the LCC rectifier.

LCC system usage has generally been confined to point-to-point HVDC transmission networks because the means by which LCCs interrupt HVDC transmission line fault current makes it mandatory to reverse the transmission line voltage. Such voltage reversals will affect all terminals in an LCC-based multi-terminal HVDC network and the exceptional LCC-based multi-terminal HVDC networks have therefore been designed on the basis that the control systems of the LCCs at all terminals must have protection features that are coordinated in a manner that prevents power flow between two fully functional terminals when a third terminal suffers a fault. An additional aspect of such voltage reversals is that the HVDC line insulation performance is adversely affected by voltage reversals and all known line insulation systems that are compatible with such voltage reversals are subject to cost and/or size penalties.

Force commutated voltage source converter (VSC) based HVDC transmission networks are also known and provide a number of power system benefits which include a bidirectional power flow capability that is achieved with a unidirectional and substantially constant HVDC transmission voltage. Known VSC topologies have an inability to limit and interrupt rectifying mode dc link current and HVAC switchgear has been used to interrupt the ac supply to the VSC in rectifying mode. One potential advantage of known VSC topologies is that their unidirectional and substantially constant HVDC transmission voltage would be beneficial to multi-terminal HVDC transmission networks wherein reversible power flow between any and all terminals is a requirement. However, given the inability of known VSC topologies to limit and interrupt rectifying mode dc link current, and also given the non-availability of circuit breaker switch contact systems that can interrupt high levels of direct current and then immediately withstand a high re-applied high dc voltage between contacts, all terminals of such multi-terminal HVDC transmission networks would suffer a discontinuity of power flow while several steps take place. Such steps include: HVAC switchgear at all terminals are opened to clear fault current; HVDC off load isolators are opened to isolate the HVDC terminals of the faulty terminal; HVAC pre-charging switchgear at all terminals are closed in order to allow the HVDC transmission voltage to be re-instated and corresponding VSCs to be re-synchronised with their HVAC network; and HVAC switchgear at all terminals are closed in order to allow the re-instatement of HVDC power flow.

Appropriate power system design processes would be used to enable the duration of this discontinuity of power flow to be minimised but a duration of at least one second might be expected.

Another critical aspect of power system design would be that of HVDC transmission line fault current limitation, it being the case that the HVDC fault current magnitude would be the summation of the contributions from the respective terminals. The thermal effect of such an HVDC fault current scenario upon cable and switchgear ratings would be significant.

Multi-terminal HVDC transmission networks have been proposed as the principal method of overcoming the effects of the inherent discontinuity and inconvenient location of energy devices (e.g. wind turbines, subsea turbines, and other renewal energy devices that extract energy from waves or tidal flows) or other power sources, and at the same time these networks would increase security of power supply to the loads that are fed by each terminal. Requirements are emerging for extensive and complex interconnection of remotely sited power sources and loads and, taking into account the known limitations of HVAC transmission networks, it is recognised that a multi-terminal HVDC approach would be most appropriate if the above mentioned obstacle of HVDC current interruption was removed. Accordingly, many methods of overcoming this obstacle, i.e. satisfying the requirement to interrupt current in HVDC circuits, have been proposed but none have yet reached practical feasibility.

The series and/or parallel connection of many circuit breaker switch contact systems in a manner that reduces the volt-amp rating of individual switch contact systems is known not to be viable at the ratings of interest (typically >100 kV and >1000 A) and so these methods have generally employed the principle of hybridisation of a switch contact system, that is able to carry high levels of direct current and is able to block high dc voltage but is not able to transit from the former to the latter state, with another circuit that performs the current interruption. The following aspects of hybridisation are known, either in the context of ac current interruption or dc current interruption:

The connection of a passive resonant circuit in parallel with a circuit breaker switch contact system in order to cause momentary reversals of current in the open and arcing switch contact system. Such an arrangement is inherently capable of operating with dc current in both polarities and having low power losses.

The connection of a spark gap switched passive resonant circuit in parallel with a circuit breaker switch contact system in order to cause momentary reversals of current in the open and arcing switch contact system. Such an arrangement is inherently capable of operating with dc current in both polarities and having low power losses.

The connection of a power semiconductor switched and pre-charged passive resonant circuit in parallel with a circuit breaker switch contact system in order to cause momentary reversals of current in the open and arcing switch contact system. Such an arrangement is not capable of operating with dc current in both polarities but power losses are low.

The connection of a gate commutated power electronic switching device in parallel with a circuit breaker switch contact system, the power electronic switching device being set to turn on before the switch contacts open and turn off after switch contacts open, thereby causing the switch contacts to open with a very low voltage between contacts (the on state voltage drop of the power semiconductor device). Such an arrangement is capable of operating with dc current in both polarities when a gate commutated switching device is provided for each polarity or when such a gate commutated device is incorporated within a diode bridge rectifier, and the system has low power losses.

The connection of an inverse parallel connected pair of gate commutated switching device in series with a capacitor, this series circuit being connected in parallel with a circuit breaker switch contact system, the parallel circuit being connected in series with a series resonant network comprising inductance and capacitance and being tuned to resonate at line frequency. The power electronic switching device is set to turn on before the switch contacts open and turn off after switch contacts open, thereby causing the switch contacts to open with a low and increasing voltage between contacts (the sum of the on state voltage drop of the power semiconductor device and the voltage across the capacitor, the latter voltage being defined to be sufficiently low to prevent re-strike of the ac rated circuit breaker switch contact system and not increasing to a particularly high voltage level since the capacitor is exposed to an ac current waveform). This arrangement is only capable of operating with ac current and the system incurs the power losses associated with the series resonant network.

The connection of a gate commutated power electronic switching device in series with a circuit breaker switch contact system, the power electronic switching device being entirely responsible for interruption of current, the series connected switch contact system being used for off load isolation purposes and being reliant upon the prior operation of the power electronic switching device or ac switchgear as described above. Such an arrangement is capable of operating with dc current in both polarities when a gate commutated switching device is provided for each polarity and the system has high power losses.

SUMMARY OF THE INVENTION

The present invention provides an improved hybrid circuit breaker having a fault-interrupting switch contact system that can interrupt high levels of direct current and then immediately withstand a high re-applied high dc voltage between contacts.

More particularly, the circuit breaker comprises a first dc line electrically connectable to first incoming and outgoing dc lines, the first dc line including a first fault-interrupting switch contact system having contacts; and a first switching aid network. The first switching aid network comprises first and second rectifier strings, wherein each rectifier string has one or more series connected reverse blocking power electronic devices that define a first H-bridge rectifier having first and second dc input terminals and first and second dc output terminals, wherein the first and second dc input terminals being connected to the first dc line in parallel with the first fault-interrupting switch contact system. The first switching aid network further comprises a snubber string having one or more series connected power electronic devices capable of being turned on by gate control and a capacitor, wherein the snubber string is connected between the first and second dc output terminals of the first H-bridge rectifier. The first switching aid network further comprises a pre-charge string having one or more series connected power electronic devices capable of being turned on by gate control and a resistor, the pre-charge string being connected between the first and second dc output terminals of the first H-bridge rectifier, and a surge arrester connected between the first and second dc output terminals of the first H-bridge rectifier.

The circuit breaker is based on a parallel connected hybrid switchgear approach where the action of rapidly opening the contacts of the fault-interrupting switch contact system causes an arc to be formed. The arc voltage is particularly high as a result of the cooling effect of the working fluid (e.g. a dielectric liquid or gas) in which the fault-interrupting contact system is immersed in use, and the arc voltage is sufficient to cause current to be diverted from the switch contact system and into the naturally commutated switching aid network. The contacts of the fault-interrupting switch contact system can be actuated by a suitable actuating mechanism.

A primary function of the switching aid network is to cause the arc to transit into and thereafter remain in an astatic region within its operating characteristics as described in more detail below. More particularly, the present invention further provides a method of interrupting fault current using a circuit breaker comprising a dc line electrically connectable to incoming and outgoing dc lines, the dc line including a fault-interrupting switch contact system having contacts, and a switching aid network connected to the dc line in parallel with the fault-interrupting switch contact system. The method comprises: actuating the fault-interrupting switch contact system so that the contacts open causing an arc to be formed and wherein the switching aid network causes the arc to transit into and thereafter remain in an astatic region until it is extinguished.

After the fault-interrupting switch contact system has been actuated, the method may further comprise the step of turning on the power electronic devices in the snubber string by gate control. The dc line current (or arc current) is commutated into the snubber string when the power electronic devices are turned on and the arc transits into the astatic region and remains in the astatic region. The dc line current is then subsequently commutated into the surge arrestor of the switching aid network.

A secondary function of the switching aid network is to limit the transient recovery voltage that is applied to the circuit breaker switch contact system, in the process dissipating inductive switching energy.

The switching aid network can optionally provide a tertiary function of line current and voltage transient moderation whilst pre-charging the dc line prior to transmission of power. More particularly, during pre-charging whilst the contacts of the fault-interrupting switch contact system are open, the method may comprise the steps of turning on the power electronic devices in the pre-charge string by gate control, and closing the contacts of the fault-interrupting switch contact system. The contacts of the fault-interrupting switch contact system can be closed only when the voltages in the incoming and outgoing dc lines are substantially equal.

It is essential that the fault-interrupting switch contact system develops sufficient arc voltage to permit commutation of current in the switch contact system and diversion of this current into the switching aid network. Accordingly, the fault-interrupting switch contact system may be of a type that overcomes the thermal ionisation that would otherwise permit continuous conduction through the plasma between the respective contacts of the contact system. Normally in high pressure arcs the dominant form of plasma generation is thermal ionisation but it is known that switch contact system damage may occur following pre-strike if this is allowed to occur, and more particularly, that such contact system damage may cause the ejection of metal vapour into the arc, this being a source of conductive plasma that may dominate over the normally dominant mechanism of thermal ionisation. The space between the respective contacts of the fault-interrupting switch contact system will therefore be provided with a de-ionisation means that dominates over arc current derived thermal ionisation to the extent that re-combination of ionised components occurs and the arc is extinguished. In the present invention this de-ionisation means can be provided by the rapid and turbulent flow of a pressurised fluid that may comprise liquid, vapour and/or gaseous thermal decomposition phases of the dielectric liquid or gas. The present invention can further provide means by which pre-strike damage is avoided. The pressurised flow may be imparted by any suitable means and it is preferred that one of an existing well known range of HVAC circuit breaker technologies is employed. The working fluid may be mineral transformer oil, synthetic transformer oil, dry air, sulphur hexafluoride or any other fluid that provides the required arc de-ionisation function. The gap between the respective contacts of the fault-interrupting switch contact system must rapidly extend and attain sufficient contact face separation in order to prevent excessive thermal ionisation from occurring and to allow sufficient arc voltage to be generated to allow the required rapid commutation to occur. Any convenient number of series connected contact gaps may be employed in order satisfy the requirement for contact separation. The actuation of the contact separation may be by any convenient means and it is preferred that one of an existing well known range of HVAC circuit breaker technologies is employed. A number of suitable HVAC circuit breaker technologies are now briefly disclosed but other suitable technologies will be known to the skilled person.

Bulk oil circuit breakers have fixed and moving contacts that are immersed in transformer oil. An electromagnetic or, less commonly, pneumatic actuator causes the moving contact to rapidly separate from the fixed contact thereby causing an arc to be struck between contacts. The initial separation of contacts causes a very high voltage gradient and electrical energy density to be present in the transformer oil and the consequently high thermal energy density causes a conductive plasma to be formed according to the process of thermal ionisation. The heat of the arc causes vaporisation and, subsequently, thermal decomposition of the transformer oil to occur. The arc column length increases with contact separation and the column is surrounded by a gas bubble whose composition is approximately 70% hydrogen, 20% acetylene, 5% methane and 5% other organic gasses. The gas bubble becomes pressurised as it displaces nearby liquid. The pressure may be moderated by the incorporation of a gas blanket expansion chamber above the oil level and in any case is dependent upon the electrical energy input and fluid shock wave propagation. The gas bubble pressure is typically in the range 0.5 MPa to 5 MPa (5 to 50 bar) and its contents are a highly turbulent mixture of gases, vapour and liquid. The bubble has an intense cooling and de-ionising influence upon the arc column.

Explosion pot oil circuit breakers enhance the mechanisms that are inherent in the bulk oil circuit breaker by confining the arc within a pressure resistant electrically insulating chamber with transverse exhaust ports that are located close to the arcing space. The thermal decomposition and pressurisation of the oil causes the same turbulent fluid mixture as above to be rapidly blown through the arc and out of the exhaust. Hence the enhancement over the bulk oil circuit breaker is defined by the use of thermal energy to cause directed fluid motion. The fluid flow is highly dependent upon arc energy and low current arc interruption performance is generally poor. Derivatives of these circuit breakers employ a small sealed chamber of oil that is exposed to the arc and is vaporised so as to promote fluid flow during operation at low currents.

The minimum oil circuit breaker further enhances the mechanisms that are inherent in the bulk oil circuit breaker by striking the arc between a contact nozzle and a contact rod within a pressure resistant electrically insulating chamber, and by the addition of a contact motion driven pumping device to force the fluid flow which is directed through the nozzle and the arc which is formed between the nozzle and rod contacts.

Air blast circuit breakers employ dry compressed air as the arcing medium and extinguishant. Sulphur hexafluoride puffer type and arc-assisted blast circuit breakers use sulphur hexafluoride as the arcing medium and extinguishant. The compressed air and sulphur hexafluoride, respectively, is released or pumped through a similar contact nozzle system as the minimum oil circuit breaker.

In all of the above-described HVAC circuit breaker types, the arc voltage might be sufficient to extinguish the arc when contacts are opened rapidly whilst a very low line current flows. However, it is more common for arc extinction to occur at the natural current zero of the ac waveform. None of the above-described circuit breakers could reliably interrupt significant current in HVDC circuits without the enhancement provided by the present invention.

Further circuit breaker topologies that employ pumped and directed working fluid flow and rapid contact actuation may be developed from the above industry standard HVAC circuit breakers. The hybridisation of the naturally commutated power electronic circuits specified herein with any of the above circuit breaker technologies and their derivatives is considered to fall within the scope of the present invention.

The circuit breaker may optionally further comprise one or more isolating switch contact systems. Such isolating switch contact systems may employ any convenient switch type from an existing well known range of HVAC isolating switch contact systems. These switches are not required to break significant current and do not rely upon a fast-flowing cooling dielectric environment to achieve rapid arc extinction but their size may be reduced if their contact system is designed to benefit from one of the above dielectric working fluids. In other words, the optional isolating switch contact systems may also be immersed in a dielectric liquid or gas if this provides practical benefits.

The actuation of the fault-interrupting and optional isolating switch contact systems may be initiated by a circuit breaker controller according to the presence of fault signals or operator commands. The circuit breaker controller can optionally receive inputs from current and voltage transducers and/or from an operator interface. The circuit breaker controller can provide time-sequenced outputs (e.g. trigger or command signals) to the respective switch contact actuators and gate driver units. Status outputs may be optionally provided for the operator. The primary function of the circuit breaker controller is to detect that an over-current fault has occurred, e.g. by processing the inputs provided by the current and voltage transducers; to simultaneously initiate the opening of the contacts of the fault-interrupting switch contact system; to request the gate controlled turn on of the power electronic devices in the snubber string, the actual point in time when devices turn on then being determined by the gate driver units in response to the development of a forward bias voltage (anode positive with respect to cathode) which corresponds with the development of arc voltage as switch contacts first separate; and finally to open the contacts of the relevant isolating switch contact system(s) after current has been interrupted. A similar sequence is followed if the operator instructs the circuit breaker to open.

When the circuit breaker is reset (which can be in response to an operator instruction) the contacts of the relevant optional isolating switch contact system(s) are closed; the power electronic devices in the pre-charge string are turned on by gate control; the power electronic devices in the snubber string are turned on when the outgoing dc line voltage has increased sufficiently; and finally the contacts of the fault-interrupting switch contact system are instructed to close.

The switch commutation process and arc characteristics are coordinated in order to guarantee astatic behaviour of the arc. More particularly, the present invention relies upon the low impedance of the switching aid network as a means of forcing the arc to enter an astatic negative resistance mode whilst at far greater current than would enable astatic behaviour under steady state conditions. The arc behaviour is now described in an introductory manner and then in more detail.

Simplistically, for the purpose of introduction, in the case where switch contacts have been rapidly separated within a tank that is filled with un-pressurised dielectric liquid then the steady state voltage drop of the arc is governed by the modulation of its column resistance in order to attain thermal equilibrium within the arc and nearby liquid dielectric. A liquid dielectric immersed arc may be considered to have static and astatic behavioural regions. At high currents the voltage drop across the arc increases with current and the arc is said to behave statically. As current is reduced the resistive heat input within its column reduces and the column naturally constricts in order to maintain a sufficiently high temperature to maintain the plasma. Initially, any reduction in current is countered by an increase in column current density and power density at a rate that causes voltage drop to reduce with current, i.e. since dv/di is positive the arc has positive resistance. As current is reduced further the degree of constriction is such that the column current density, power density and temperature increase to the point where the radiation term of dissipation dominates over the convection and conduction terms and the column is effectively surrounded by an environment that operates with a very high heat flux density. Further reductions in current cause the development of an astatic behaviour wherein arc voltage increases in order to allow heat input to balance with heat output, i.e. since dv/di is negative the arc has negative resistance. The negative resistance of the arc eventually becomes more significant than the dynamic impedance of the source of power that previously maintained the arc and thus the arc extinguishes. This potentially causes an extremely high voltage transient to occur in the process. More particularly, a pressurised gas and/or vapour bubble with entrained residual traces of liquid rapidly forms around the arc column and this is subject to pressurisation and violent turbulence. In the case of common organic liquid dielectrics, the liquid decomposes to form a gas mixture whose most significant constituent is hydrogen. A complex cooling mechanism is established and, in practice, the presence of gaseous products of liquid decomposition and turbulence serve to enhance the cooling of the arc. The motion of the switch contacts also causes arc length to vary with time and promotes turbulence. Furthermore the transient voltage drop in the arc is governed by the instantaneous current that flows in the arc, the instantaneous length of the arc (the distance between moving contacts), and the quantity of heat that has previously been fed into the arc prior to that instant in time. The quantity of heat that is fed into the arc is a function of arc current, arc voltage, and time. The greater the quantity of heat that has been fed into an arc of fixed length, the lower the arc voltage for a particular current or vice versa. If a constant current flows in an arc of fixed length, the arc voltage reduces as time passes until it reaches steady state conditions. The transient arc voltage for a given arc current and arc length increases as transient duration decreases. In general terms, the longer the arc length is, and the better the cooling is, and the shorter the transient is, the greater the arc voltage is. The turbulent nature of the decomposing liquid and gas cooling environment and the time-variable geometry of the arc within are extremely difficult to treat theoretically.

Now in more detail, it is preferable that the above-described arc cooling and arc voltage generation mechanisms are enhanced by forcing dielectric working fluid to flow through multiple series connected arcs that form between the rapidly separating contacts of the fault-interrupting switch contact system. It is also preferable that the commutating loop inductance including series connected switch contact systems, rectifier strings, snubber string, and high voltage interconnections, is minimised. More particularly: (i) the quantity of heat that may be removed from the arc(s) is closely related to the mass of dielectric working fluid that is transported through and around the arc(s) and how widely dispersed this heat is within the arc(s) within a given time period, and (ii) the quantity of heat that must be removed from the arc is closely related to the commutating inductance. Although originally designed for use in HVAC circuits, the minimum oil type circuit breaker described above has features that are beneficial to the specified parallel connected hybrid switchgear, i.e. the minimum oil type circuit breaker may have multiple rapidly actuated switch contact sets that are exposed to forced high pressure, high velocity liquid flow and its physical size and interconnecting inductance (a constituent part of commutating inductance) are relatively small. The minimum oil type circuit breaker and other forms of dielectric liquid and gas immersed switchgear may be viable for use in the present invention providing the arc voltage is established sufficiently rapidly and arc current is commutated into the snubber string sufficiently rapidly for the arc to transit into and be maintained in the astatic condition. As used herein, the term 'astatic' defines that a regenerative process causes arc voltage to be sufficiently in excess of the voltage across the capacitor in the switching aid network for the residual voltage that is impressed upon the commutating inductance to cause arc current to reduce until arc extinction occurs as current zero is approached, and thereafter for arc current to remain at zero.

It will therefore be readily appreciated that more than one series connected fault-interrupting switch contact system (or series connected switch contacts) can be provided in the first dc line.

The switching aid network can employ any suitable power electronic devices.

Examples of suitable reverse blocking devices for the first H-bridge rectifier would include diodes, static induction transistor (SIT) derivatives and any other devices that are equivalent to a diode whose functionality is defined as having a low forward voltage drop when forward biased (anode positive with respect to cathode) and a low reverse leakage current when reverse biased (anode negative with respect to cathode). It will be readily appreciated that the first H-bridge rectifier has four arms and that the reverse blocking devices in one diagonally opposed pair of arms will conduct at any time while the reverse blocking devices in the other diagonally opposed pair of arms will block—see the upper diagrams in FIGS. 4 to 6, for example.

An example of a suitable power electronic device that is capable of being turned on by gate control is the thyristor. Other non-preferred examples of such devices are insulated gate bipolar transistors (IGBTs) and gate commutated thyristors (GCTs). It is preferable that thyristors and any other devices that are equivalent to a thyristor are used, where the functionality of the thyristor is defined as having a low forward leakage current when forward biased (anode positive with respect to cathode) and not turned on by gate control, a low forward voltage drop when forward biased (anode positive with respect to cathode) and turned on by gate control (this mode of turn on being defined by the momentary application of a gate current pulse, after which the device remains in the on state until reverse biased), and a low reverse leakage current when reverse biased (anode negative with respect to cathode). Although the use of IGBTs and GCTs is considered to be within the scope of the present invention, it is preferable that a plurality of thyristors, or their equivalents, are series connected.

In each string of the switching aid network it is preferable that a plurality of power electronic devices are series connected and furthermore that all failure modes that may affect each device result in the establishment of a failed state wherein the affected device has a low voltage drop irrespective of polarity of biasing. A total of N+M power electronic devices can be connected in series in order to provide series redundancy which is defined as M devices being provided to provide margin for M failures in a string of devices when N series connected devices is sufficient for operation at maximum current and voltage rating. It is preferable that pressure contact forms of the above power electronic devices are employed. It is particularly beneficial that thyristors and their equivalents are employed when gate control is required since these devices have a particularly low gate control power requirement, a feature that aids the simplification and efficiency of the associated gate driver units.

A resistor (a so-called bleed resistor) can be provided in parallel with the capacitor of the snubber string of the first switching aid network.

The switching aid network can further comprise at least one additional surge arrester connected between the first dc line and a ground reference. For example, a first surge arrestor can be connected on an incoming dc line-side of the first fault-interrupting switch contact system and a second surge arrestor can be connected on an outgoing dc line-side of the first fault-interrupting switch contact system.

The surge arrestor(s) can be of any type that employs a non-linear resistance characteristic, e.g. metal oxide varistors.

The circuit breaker can further comprise at least one earthing switch connected to the first dc line.

The circuit breaker can further comprise a first isolating switch contact system connected to the first dc line and electrically connectable to the first incoming dc line and/or a second isolating switch contact system connected to the first dc line and electrically connectable to the first outgoing dc line. The first and/or second isolating switch contact system can have contacts that can be actuated by a suitable actuating mechanism, optionally under the control of the circuit breaker controller. In other words, the circuit breaker controller can control both the first fault-interrupting switch contact system and any optional isolating switch contact system.

If configured for use in a bipole network, for example, then the circuit breaker can further comprise: a second dc line electrically connectable to second incoming and outgoing dc lines, the second dc line including a second fault-interrupting switch contact system having contacts; and a second switching aid network. The second switching aid network may comprise: first and second rectifier strings, wherein each rectifier string has one or more series connected reverse blocking power electronic devices that define a second H-bridge rectifier having first and second dc input terminals and first and second dc output terminals, the first and second dc input terminals being connected to the second dc line in parallel with the second fault-interrupting switch contact system. The second switching aid network may further comprise a snubber string having one or more series connected power electronic devices capable of being turned on by gate control and a capacitor, wherein the snubber string is connected between the first and second dc output terminals of the second H-bridge rectifier. The second switching aid network may comprise a pre-charge string having one or more series connected power electronic devices capable of being turned on by gate control and a resistor, wherein the pre-charge string is connected between the first and second dc output terminals of the second H-bridge rectifier, and a surge arrester connected between the first and second dc output terminals of the second H-bridge rectifier.

The second switching aid network can have the same overall configuration as the first switching aid network described above.

The switching aid network can further comprise at least one additional surge arrester connected between the second dc line and a ground reference. For example, a first surge arrestor can be connected on an incoming dc line-side of the second fault-interrupting switch contact system and a second surge arrestor can be connected on an outgoing dc line-side of the second switch contact system. The ground reference will typically be a common ground reference. In other words, any additional surge arrestors connected to the first and second dc lines will typically be connected to the same ground reference.

The circuit breaker can further comprise at least one earthing switch connected to the second dc line.

The circuit breaker can further comprise a third isolating switch contact system connected to the second dc line and electrically connectable to the second incoming dc line and/or a fourth isolating switch contact system connected to the second dc line and electrically connectable to the second outgoing dc line. The third and/or fourth isolating switch contact system can have contacts that can be actuated by a suitable actuating mechanism, optionally under the control of the circuit breaker controller.

Separate controllers can be provided for the first and second fault-interrupting switch contact systems but with additional synchronisation functions to allow the switch contact systems to be operated in a synchronised manner if this is desirable. The first and second fault-interrupting switch contact systems can be operated independently.

DETAILED DESCRIPTION OF THE INVENTION

Figure 1:
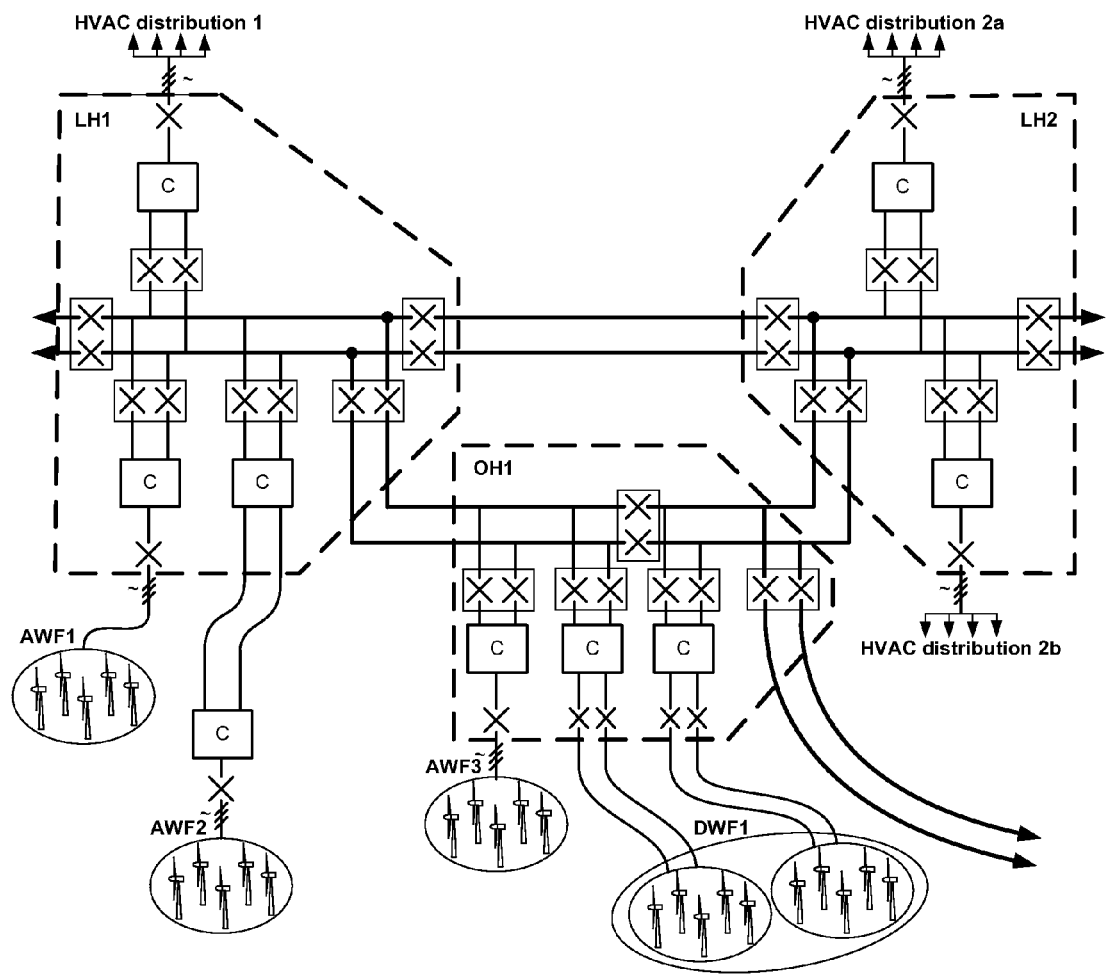
FIG. 1 is a schematic view of a multi-terminal network that can incorporate the circuit breaker of the present invention.

FIG. 1 shows part of a generic symmetrical bipole, multi-terminal network with meshed, point-to-point and multi-channel transmission line elements. High voltage alternating current (HVAC) circuits are identified by the industry standard symbol /// denoting three phase circuits, but it will be readily appreciated that any convenient number of phases can be used in practice. High voltage direct current (HVDC) circuits are identified by parallel running pairs of lines. Bold lines indicate meshed heavy current circuits into which lower current circuits are terminated. The meshed heavy current circuits have a plurality of terminals (i.e. connections to the lower current circuits) and so the network defines a multi-terminal network. Such a multi-terminal network might be extensive and so only part is shown in FIG. 1 for the purpose of providing technical background to the present invention. The arrow heads provided on some of the lines indicate that the network can be extended to other regions.

Ground return conductors are not shown for reasons of clarity.

Static power converters are labelled 'C' and represent either DC/DC converters or AC/DC converters as will be clear to the skilled person.

Switchgear are generally labelled by the symbol x, these symbols further being placed within a rectangular box in the case of HVDC switchgear. The HVDC switchgear can be any mix of circuit breakers according to the present invention and isolators as appropriate.

In practice, the network can be a multi-terminal HVDC network that receives power from one or more power sources such as remotely located energy devices, e.g. wind turbines, subsea turbines, and other renewal energy devices that extract energy from waves or tidal flows. The network can also selectively receive power from, and/or transmit power to, one or more remotely located HVAC power transmission and distribution networks.

In such a network it can be convenient to locate a number of terminals in a hub wherein any convenient number of HVDC transmission lines converge and are interconnected to form a node. Each hub may comprise any convenient number of internal busbar sections that are interconnected by switchgear and any convenient number of terminals may be connected to each internal busbar section. Internal busbar sections may be connected to any convenient number of the HVDC transmission lines of the meshed network by means of switchgear and suitable terminations. Each terminal may comprise switchgear and a static power converter. A hub may be located on-shore or off-shore, e.g. at a suitable platform. The overall network may comprise any convenient number of hubs.

Each terminal can be connected to a corresponding power source or load by means of a static power converter in a single channel or multiple channel arrangement according to the total power rating of that terminal, the requirement for gradual degradation of performance following equipment failures, and a preference to employ modular power conversion solutions when total power rating makes this modularity practically effective. A terminal can be connected to the corresponding power source or load by means of an HVAC transmission interface with any convenient number of phases (typically 3, 6 or 12) at any convenient frequency (typically 50 Hz or 60 Hz), or by means of an HVDC transmission interface. The choice of static power conversion equipment will be selected according to the nature of the interface and the terminal. Voltage source converters (VSCs), current source converters (CSCs) and DC/DC power converters may be employed providing they are suitably adapted to the terminal voltage and current specifications, it being the case that HVDC transmission voltage reversals are not permitted and that dc-side short circuit current must be limited to a defined maximum prospective dc short circuit level by either active control of the power converter or the use of a defined interconnecting impedance. DC/DC power converters may use any convenient topology. The static power conversion equipment may optionally employ power transformers that provide galvanic isolation between associated terminal and interface. In particularly extensive multi-terminal networks there may be a desire to employ more than one dc voltage level for transmission and interposing DC/DC converters of any convenient topology may be employed. There may also be a desire to employ a mix of bipolar and monopolar transmission voltages and such transitions between transmission voltages may optionally employ such interposing DC/DC power converters.

Generally VSCs will have no active ability to limit and interrupt dc-side fault current whilst rectifying, this dc-side fault current being defined by the ac line impedance that is applied to the VSC and any ability to interrupt dc-side fault current bring provided by HVAC switchgear in the ac lines that are connected to the VSC, but they may limit and interrupt ac-side fault current whilst inverting. In any case a multi-terminal HVDC network may extend over great distances and terminals may be located in several countries. Accordingly, there will be a requirement for competitive sourcing of equipment and different forms of static power converter, each having its own particular ability or inability to limit dc fault current, may be connected to the multi-terminal network. It is possible that a dc short circuit or low impedance fault may develop in any part of the meshed interconnecting system or in an individual terminal or the equipment within that terminal or the interconnecting cable associated with that terminal. After such a fault has been isolated and corrected there will be a requirement to return the affected part of the network to service and the action of re-establishing the voltage in interconnecting cables is associated with a requirement to control the charging current and transient voltage response that are associated with the main wall insulation capacitance of the cable and any capacitance that may be an inherent feature of the connected power conversion equipment. These faults and the associated recovery processes must be performed whilst minimising the disturbances throughout the remainder of the multi-terminal HVDC network. Thus a reliable method of interrupting substantial currents and controlling switchgear inrush current in HVDC circuits is required in order to allow continuity of power to be maintained and the present invention therefore addresses the requirement for an HVDC circuit breaker with a pre-charge function.

The network shown in FIG. 1 includes three different hubs.

A first on-shore (or land-based) hub LH1 includes terminals for a HVAC power transmission and distribution network labelled 'HVAC distribution 1', a first wind farm labelled 'AWF1' with an HVAC power collection and transmission interface, and a second wind farm labelled 'AWF2' with an HVAC power collection and a HVDC transmission interface These terminals are connected to a single internal busbar section of the hub LH1. The internal busbar section is connected to three HVDC transmission lines of the meshed network by means of switchgear.

A second land-based hub LH2 includes terminals for a first HVAC power transmission and distribution network labelled 'HVAC distribution 2a,' and a second HVAC power transmission and distribution network labelled 'HVAC distribution 2b.'

These terminals are connected to a single internal busbar section of the hub LH2. The internal busbar section is connected to three HVDC transmission lines of the meshed network by means of switchgear.

An off-shore hub OH1 includes terminals for a first wind farm labelled 'AWF3' with an HVAC power collection and transmission interface, and a second wind farm labelled 'DWF1' with a dual-channel HVDC power collection and transmission interface These terminals are connected to two internal busbar sections of the hub OH1. The first wind farm AWF3 is connected to a first internal busbar section. A first channel of the second wind farm DWF1 is connected to the first internal busbar section and a second channel is connected to a second internal busbar section. The first and second internal busbar sections are interconnected by means of switchgear as shown in FIG. 1. The first busbar section is directly connected to one HVDC transmission line of the meshed network. The second busbar section is connected to one HVDC transmission lines of the meshed network by means of switchgear and is directly connected to the other HVDC transmission line of the meshed network.

The network may employ point-to-point, multi-channel and meshed transmission line elements according to power system availability and fault tolerance requirements.

For example, the HVDC transmission line that connects the wind farm AWF2 to the terminal of hub LH1 is a point-to-point line element with the transmission line being of such length and power rating as to require the use of an HVDC transmission voltage. The HVDC transmission line that connects the wind farm DWF1 to the respective terminals of hub OH1 is a dual-channel element with the transmission lines being subject to a sufficiently high availability requirement, and being of such length and power rating as to require the use of two independent channels of power transmission and an HVDC transmission voltage.

The meshed nature of the network in this example shows hubs LH1 and LH2 interconnected by two parallel-connected transmission lines, the first linking hubs LH1 and LH2 directly and the second linking hubs LH1 and LH2 by means of the intermediary hub OH1. As such, the meshed network has minimal ability to actively control load flow balance between the two parallel connected transmission lines. In practice, interposing DC/DC power converters (not shown) may be added at any convenient point(s) in the meshed network in order to exert active control of load flow in parallel branches of the network if this is required. DC/DC power converters (not shown) may also be added at any convenient point(s) in the meshed network in order to allow regions of the network to operate at any convenient power transmission voltage. The terminals in the network may each convey power in a first single direction (associated with power generation) or a second single direction (associated with power consumption) or symmetrically in both directions or asymmetrically in both directions. The terminals are each defined as operating at a substantially constant dc voltage (typically >100 kV) and at a dc current whose magnitude is approximately proportional to power flow and whose polarity corresponds with the direction of power flow. Each terminal may receive or deliver power in ground referenced monopole, symmetrical monopole, asymmetric bipole or symmetric bipole forms, or in balanced and asymmetric multiple channel derivatives of these forms. Multiple channels and meshed interconnections may be used to reduce the power system disturbance that results from the loss of a single channel or a single branch in a mesh.

It will be readily appreciated that the circuit breaker of the present invention is not limited to use in a network of the sort shown in FIG. 1, which is included for illustrative purposes only.

Figure 2:
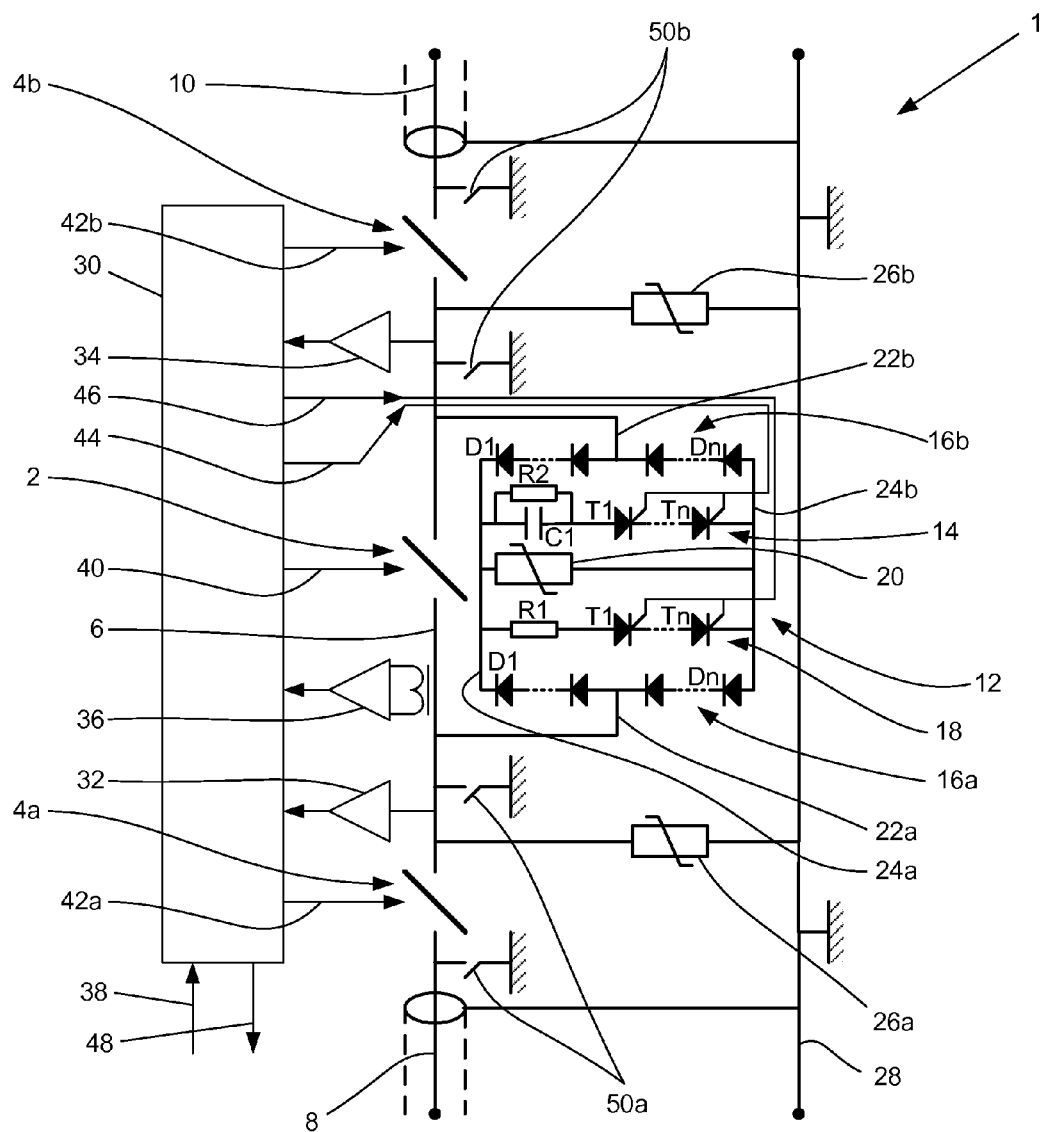
FIG. 2 is a schematic view of a first circuit breaker according to the present invention.

A first circuit breaker 1 is shown in FIG. 2 for a ground referenced or asymmetric monopole HVDC network with bidirectional current. The circuit may be simplified as described below when operating with unidirectional current.

The circuit breaker 1 includes a fault-interrupting switch contact system 2 and two optional series connected isolating switch contact systems 4a and 4b in a dc line 6 that extends between an incoming dc line 8 and an outgoing dc line 10 of the HVDC network.

The circuit breaker also includes a switching aid network 12 having a snubber string 14, two rectifier strings 16a, 16b, a pre-charge string 18, and at least one surge arrester 20.

Each rectifier string 16a, 16b includes any suitable number of series connected diodes D1 . . . Dn in order to define a naturally commutated H-bridge rectifier having two reversible polarity dc input terminals 22a, 22b and two dc output terminals 24a, 24b. The dc input terminals 22a, 22b are connected to the dc line 6 in parallel with the fault-interrupting switch contact system 2 and the voltage between the dc output terminals 24a, 24b is approximately equal to the modulus of the arc voltage of the switch contact system when an arc is present, or the modulus of its open circuit voltage when an arc is not present.

The pre-charge string 18 includes any suitable number of series connected thyristors T1 . . . Tn and a resistor R1. The snubber string 14 includes any suitable number of series connected thyristors T1 . . . Tn, a capacitor C1, and a resistor R2. The snubber and pre-charge strings 14, 18 are connected across the dc output terminals 24a, 24b of the H-bridge rectifier.

A non-linear resistor type surge arrester 20 is also connected across the dc output terminals 24a, 24b of the H-bridge rectifier.

One or two additional surge arresters 26a, 26b may optionally be connected between the fault-interrupting switch contact system 2 and a ground reference 28. Such additional surge arresters 26a, 26b form part of the switching aid network 12.

The circuit breaker 1 is operated under the control of an electronic controller or processor 30. The circuit breaker controller 30 receives input signals from voltage transducers 32, 34 which provide an indication of the incoming and outgoing dc line voltages (i.e. voltage V1 and V2 described below) and from a current transducer 36 which provides an indication of the current in the dc line 6 (i.e. current Idc described below). The circuit breaker controller 30 also receives an input signal 38 from an operator interface (not shown) so that the circuit breaker 1 can be actuated and reset by an operator. A trigger signal 40 is provided to the fault-breaking switch contact system 2 when the switch contact system is to be actuated to open the contacts, either in the event of a fault current being detected or in response to an operator command, or when the contacts are to be closed. Trigger signals 42a, 42b to open and close the contacts are provided to the respective isolating switch contact systems 4a, 4b. Command signals 44 are provided to the gate drive units for the thyristors T1 . . . Tn in the snubber string 14 and command signals 46 are provided to the gate drive units for the thyristors T1 . . . Tn in the pre-charge string 18. A status signal 48 is sent to the operator interface (not shown).

The internal construction and insulation of the fault-interrupting switch contact system 2 can be specified in terms of a fast flowing dielectric working fluid which may be in liquid, vapour or gaseous phases or a mixture of these phases. The general arrangement of the switch contact system 2 may be designed to be constructed and externally insulated in the same manner as conventional HVAC switches. In practice, such a conventional HVAC switch may be designed to be externally air insulated to either outdoor or converter hall standards, or to be within a sealed gas insulated or liquid insulated environment. The same applies to the isolating switch contact systems 4a, 4b, the surge arresters 20, 26a and 26b, and the components of the switching aid network 12. The general arrangement of the complete circuit breaker 1 must be such as to reduce the physical loop area and interconnecting inductance between the fault-interrupting switch contact system 2, the components of the switching aid network 12, and the respective interconnecting conductors to the minimum practical value for the reason now described. This interconnecting inductance defines the commutating inductance Lc of the hybrid circuit breaker and the minimum prospective energy that is dissipated in the arc(s) between the contacts of the fault-interrupting switch contact system is approximately $Lc.Idc2/2$ where Idc is the dc line current to be interrupted. The actual energy that is dissipated in the arc(s) increases relative to the minimum prospective level as commutating inductance increases since the arcing time and degree of thermal ionisation are also increased. In order to guarantee recombination of arc plasma components and consequent arc extinction, any increase in commutating inductance will be associated with the penalty of having to provide additional fluid mass flow rate and total mass transported in order to oppose the thermal ionisation process. Given this commutation inductance related circuit breaker performance dependency, it will be appreciated that equipment miniaturisation is desirable since this has a direct bearing upon commutating inductance. Accordingly, liquid dielectric immersed and gas insulated (SF6) components may be used in preference to air insulated types. By definition, the hybrid fault-interrupting switch contact system 2 and the switching aid network 12 will be co-located.

Prior to opening the fault-interrupting switch contact system 2 the voltage across the capacitor C1 in the snubber string 14 is approximately zero. When the switch contact system opens and arc voltage is developed, the thyristors T1 ... Tn of the snubber string 14 are turned on by gate control and this arc voltage causes current to flow in the snubber string, the rate at which this current increases approximately corresponds with the rate at which current falls in the switch contact system 2, the rate of change of dc line current causing a small disparity in the corresponding rates of change of current in the switch contact system and the snubber string. The magnitude of arc voltage and the interconnecting loop inductance and power electronic device voltage drops of the switching aid network 12 define the initial rate of commutation from the switch contact system 2 to the switching aid network, the voltage across the capacitance in the snubber string 14 assuming an increasing significance as the capacitor C1 charges. The arc voltage is inherently high and commutation loop inductance is minimised by careful design and accordingly the rate of commutation is high throughout the switching operation providing sufficient capacitance is employed. In fact, a sufficiently high rate of commutation is considered to be essential in order to cause the arc to behave astatically.

It is extremely difficult to specify arc voltage current characteristics in systems that have extremely high heat release rates, particularly steady state characteristics. To some extent, all arcs have sporadic behaviour and the presence of a turbulent cooling environment with variable geometry almost defies any attempt to characterise steady state conditions (if they exist). In particular, experimental measurement of steady state characteristic would be associated with MW level dissipation, huge continuous fluid flow rates and electrode (switch contact) erosion and material transport of such severity as to corrupt results. The characteristics that have been presented in FIG. 3 therefore serve only to illustrate the general behaviour of the arcs that form between fully opened contact systems. Log-log axes have been used to allow the wide dynamic range of characteristics to be visible. Indicative steady state characteristics of arc voltage and arc power dissipation versus arc current are shown in fine dashed lines. Indicative transient characteristics are shown for three combinations of variables (as annotated) are shown as fine solid lines. Astatic regions have been annotated alongside arc voltage curves. The loci of arc voltage and current versus time during circuit breaker opening under load side short circuit and rated load conditions are shown as bold dashed lines with arrow heads to indicate the passage of time.

The complete circuit breaker commutation process will now be described.

When the circuit breaker is activated, a request to turn on when forward biased command signal 44 is sent to each of the gate driver units of the thyristors T1 ... Tn of the snubber string 14 and the fault-interrupting switch contact system actuation is released in response to a trigger signal 40. The gate driver units receive the request to turn on almost immediately (typically with a delay of <1 µs) and await the presence of suitable conditions for gate controlled turn on of the thyristors T1 ... Tn. After a short signal transmission and actuator release propagation delay (typically <10 ms) the contacts of the fault-interrupting switch contact system 2 start to rapidly open and typically reach full contact separation in less than 10 ms after the contact tips part. Dielectric working fluid is forced to flow rapidly between the contacts, this flow being an inherent feature of the suitable circuit breaker technologies described above. When a plurality of series connected fault-interrupting switch contact systems (or series connected switch contacts) are employed as a means of developing a sufficiently high arc voltage and achieving a sufficiently low arc energy density to permit rapid commutation and the establishment of astatic behaviour as described above, the actuation of the switch contact systems must be substantially simultaneous and with substantially equal: (i) contact opening velocities, (ii) fully opened contact displacement, and (iii) working fluid flow velocity and mass flow rate, in order to permit all switch contact systems to contribute substantially equally to the commutation process. Immediately after the contact tips part, the arc voltage is relatively low but rapidly increases as the contact tips move further apart. The thyristors T1 ... Tn in the snubber string 14 each receive a corresponding forward bias (anode positive with respect to cathode) as a result of the rectifier action of the rectifier strings 16a, 16b and, in response to the pre-existing request to turn on when forward biased, the gate driver units each generate a gate current pulse and the corresponding thyristors T1 ... Tn are turned on by gate control. More particularly, the gate driver units (not shown) each sense corresponding anode-cathode voltage and initiate the generation of a gate current pulse when anode-cathode voltage exceeds a predetermined threshold (e.g. 50V) with minimal propagation delay (typically <200 ns). Under the prevailing conditions of anode voltage, i.e. a rapidly increased forward bias dv/dt, the thyristors T1 ... Tn of the snubber string 14 begin to conduct current between anode and cathode within a typical delay time of 2 μs after the initiation of the generation of a gate turn on current pulse by the gate driver units. Moreover, the inherent nature of thyristors is such that this delay time reduces as dv/dt increases, i.e. the speed of thyristor turn on adapts to the rate of increase of fault-interrupting switch contact system arc voltage. Thereafter arc voltage is sufficient to cause current to flow in the thyristors T1 . . . Tn. Thyristor current increases rapidly and in any case this rate of change of current is far greater than may occur in the dc line 6. Accordingly, the arc current reduces at a rate that corresponds with the rate of increase of thyristor current. The rapid reduction of arc current becomes significant almost immediately (typically <2 μs) after the switch contacts part and therefore the transient duration and magnitude of this arc current are insufficient for the heat input to the arc(s) to sustain a conductive plasma. Hence the above-described astatic behaviour occurs. Peak arc voltage is experienced at or shortly before the point in time where contact system travel first reaches its maximum extent and then reduces progressively as the heat input to the arc(s) when integrated over time increases while arc current reduces. As arc current continues to fall, the arc behaviour transits further into the astatic region until the negative resistance of the arc dominates over the dynamic impedance of the commutating loop and thereafter arc voltage increases sharply while arc current falls sharply to the point where arc extinction occurs. After arc extinction the current in the dc line 6 of the circuit breaker flows in the snubber capacitor C1 which continues to charge and the voltage across the fault-interrupting switch contact system continues to increase until the voltage is in excess of the voltage of the dc power source(s) from which the fault current is drawn. From this point in time the voltage across the fault-interrupting switch contact system 2 continues to increase and the dc line current reduces at a rate that correspondingly increases as the snubber capacitor C1 continues to charge. Eventually the voltage across the switch contact system 2 is sufficient to cause the resistance of the surge arrester 20 to reduce. In the process this causes the snubber current to commutate into the surge arrester 20 in a manner that is similar to the commutation of arc current into the snubber, but the extinction of current in this case is caused by the reverse recovery of the thyristors T1 . . . Tn of the snubber string 14. After snubber current commutation the dc line current flows in the surge arrester 20 and the voltage across the switch contact system 2 is substantially constant thereby causing dc line current to reduce at a corresponding substantially constant rate until dc line current is commutated. Thereafter, the voltage across the switch contact system collapses to the same level as the voltage of the dc power source(s) from which fault current has been drawn. The majority of the inductively stored energy in the dc line 6 is dissipated in the surge arrester 20 following switch contact system 2 opening and the reverse recovery of the thyristors T1 . . . Tn of the snubber string 14.

After the circuit breaker 1 has interrupted the fault current the snubber capacitor C1 remains charged at the voltage of the dc power source(s) from which the fault current has been drawn. When an optional isolating switch contact system 4a is employed on the incoming dc line 8 (i.e. the HVDC transmission line between the dc power source(s) and the circuit breaker 1) this may be opened in response to a trigger signal 42a after the fault current has been interrupted. After opening the isolating switch contact system 4a the resistor R2 which is connected in parallel to the snubber capacitor C1 causes it to discharge and eventually approach zero volts. Another optional isolating switch contact system 4b and trigger signal 42b may be employed in the case where current flows in the opposite polarity and their operation is equivalent to the case previously described for isolating switch contact system 4a. In practice, both optional isolating switch contact systems 4a, 4b and trigger signals 42a, 42b may be employed so that the circuit breaker can be used with fault current flowing in either direction. It is the responsibility of the electronic controller or processor 30 to determine the polarity of the current flowing in the dc line 6 by reference to the input signal from the current transducer 36 and to control the appropriate isolating switch contact system 4a, 4b according to current polarity. Although it would be normal to open only the isolating switch contact system on the side of the circuit breaker that is connected to the source of the fault current, it would be acceptable to open both isolating switch contact systems substantially simultaneously if it was beneficial, e.g. to simplify overall operation.

As described above, the surge arrester 20 is connected across the dc output terminals 24a, 24b of the switching aid network 12 and, irrespective of dc line current polarity, this is effective when dc line current that flows into a load side short circuit fault is interrupted by the circuit breaker. Since the load side voltage to ground is minimal, the knee-point voltage of the surge arrester 20 is selected to be only slightly greater than normal working dc line voltage and the surge arrester slope resistance voltage drop is relatively low, the maximum voltage that is impressed upon the dc line during circuit breaker operation under load short circuit conditions is set by the surge arrester characteristics. The situation where the circuit breaker 1 interrupts a load side short circuit fault is shown in FIG. 4. The load is connected between the outgoing dc line 10 and ground reference 28. Voltage V1 is the incoming dc line voltage. Sequential current paths are annotated on the circuit diagram using three weights of dashed lines that correspond to the line type used in the current waveforms shown in the diagram immediately below. The short circuit fault current is the sum of the three sequential currents. I1 is the current in the fault-interrupting switch contact system 2. I2 is the current in the snubber string 14. I3 is the current in the surge arrestor 20. A step to a condensed timebase is employed to enable the skilled reader to appreciate the relative magnitudes of energy transfer associated with currents I2 and I3. Currents I2 and I3 also flow in the rectifier strings 16a, 16b. The surge arrester 20 of the switching aid network 12 dissipates the majority of the inductive energy in the incoming dc line 8, i.e. the leakage inductance of the incoming dc line(s) and the corresponding earth conductor(s) as defined below. The surge arrester 20 limits transient voltages that are applied between circuit breaker contacts and between the incoming dc line 8 and earth. The surge arrester 20 must absorb the maximum prospective short circuit inductive energy in the incoming dc line 8 and its source network. Prior to opening the circuit breaker a fault current flows into the short circuit through the fault-interrupting switch contact system 2 whose current is annotated I1 in FIG. 4 and 'Arc V vs I vs time (Short circuit)' in FIG. 3. The magnitude of current I1 increases with time at a rate that is set by the voltage of the dc power source(s) from which fault current has been drawn, the aggregate dc line resistance(s) and the aggregate dc line inductance(s) through which this fault current flows. In a typical multi-terminal HVDC network a plurality of power sources feed into the short circuit fault and their respective contributions to total fault current are summated according to known network and transmission line theory. In the depicted asymmetric monopole circuit breaker, the dc line current that flows from a power source must be returned to the power source by an earth conductor. Accordingly, the effective line inductance is the leakage inductance of the transmission line which comprises closely spaced parallel routed or coaxial pairs of conductors and the effective line resistance is the sum of the resistances of the pair of conductors. In practice, the short circuit behaviour of such transmission line systems is inductively dominated and, for the purpose of the present description, the operation of the system may be adequately represented by a single voltage source that is connected to the short circuit by a single equivalent worst case interconnecting inductance and the circuit breaker 1, the earth conductor taking the form of an ideal equipotential line at earth potential. Common mode effects in the power source(s), transmission lines, circuit breaker, and load circuits have not been described or depicted in drawings because they have negligible practical effect upon the aspects of the circuit breaker described herein.

Upon detecting the increasing fault current by any convenient means (e.g. by processing the input signals provided by the voltage and current transducers), circuit breaker opening is activated as described previously. During the delay between detecting the fault and contact tip separation, current I1 increases from the exemplary $1 \times 10^4$ A detection set point shown in FIG. 3 to a peak of approximately $1.1 \times 10^4$ A. As the contact tips separate an arc voltage is developed and initially increases with contact separation, reaching a peak either at or shortly before contact tip separation reaches its maximum. Thereafter, arc voltage falls progressively. The arc voltage causes current I2 to flow in the thyristors T1 . . . Tn of the snubber string 14. Since the dc line current is inductively dominated and this inductance further dominates over the commutating inductance within the circuit breaker, arc current I1 reduces as snubber string current I2 increases at an approximately equal rate. Although the falling arc voltage is insufficient to have significant bearing upon short circuit fault current at this stage, it is sufficient to cause arc current I1 to continue to reduce. The effect of the continued reduction in arc current I1 is to reduce the rate of heat input to the arc and to cause the rate of thermal ionisation to reduce significantly. As heat continues to enter the arc and arc current reduces, arc voltage continues to reduce but remains sufficient at all times to cause arc current to continue to reduce. As arc voltage transits towards a minimum value the arc enters the region of astatic behaviour and the locus of arc voltage and current becomes asymptotic with the steady state characteristic. As the arc transits further into its astatic behavioural region arc current is abruptly commutated. The log scale of FIG. 3 prevents this commutation from being visible since the astatic region extends to the left beyond the visible region of the plot. Accordingly, the locus of arc voltage and current is given an arrow head to identify practical continuation. A positive going voltage spike is present on the trace of the incoming dc line voltage V1 in FIG. 4 at the time of the abrupt commutation and the amplitude of this voltage spike is moderated by the presence of the switching aid network 12. The amplitude of the voltage spike is primarily determined by the commutating loop inductance but stray capacitance throughout the circuit breaker is also an important moderating influence. Furthermore, the finite rate of re-combination of arc plasma bounds the upper limit of positive going dv/dt of the voltage spike. After the voltage spike has subsided a very small tail in arc current flows and this tail is commensurate with the rate of recombination. The tail current is so small as not to be visible on the scale of the waveform plot in FIG. 4. Corresponding current steps are present on the traces of currents I1 and I2 in FIG. 4. The positive edge of the voltage spike is coincident with the negative going edge of the step in current I1 and the positive going edge of the step in current I2. After the abrupt commutation of arc current, short circuit fault current continues to flow in the snubber capacitor C1 thereby causing it to charge. The ability of the arc to resist re-strike increases as recombination continues. As the snubber capacitor C1 charges, the incoming dc line voltage V1 increases whilst snubber string current I2 continues to increase and the rate of increase of short circuit fault current reduces. As voltage V1 approaches rated conditions for the voltage of the dc power source(s) from which fault current has been drawn, the rate of increase of short circuit fault current and snubber string current I2 reduce to zero, and thereafter these currents start to reduce.

The circuit breaker 1 now enters the phase when fault current is interrupted by entirely electronic means and the fault-interrupting switch contact system 2 remains in the open circuit state. The commutation from snubber string 14 to the surge arrester 20 has already been outlined above and it is only necessary to add that a commutating loop inductance exists within the snubber string and surge arrester, this inductance being responsible for the reversal of snubber string current I2. The reverse recovery of the thyristors T1 . . . Tn in the snubber string 14 defines the extent of this current reversal and after a short tail I2 decays to and remains at zero amps. Short circuit fault current now continues to flow only in the surge arrester 20 and the majority of the inductive energy that was present in the incoming dc line 8 at the time of the opening of the fault-interrupting switch contact system 2 remains to be dissipated in the surge arrester 20. Current I3 in the surge arrester 20 falls at a negative di/dt that is significantly lower than the positive di/dt that existed in the incoming dc line 8 prior to opening of the fault-interrupting switch contact system 2. To enable the complete circuit breaker response to be depicted, the timebase in FIG. 4 is condensed shortly after commutation of snubber string current I2. As surge arrester current I3 reduces, the voltage drop across the slope resistance of the surge arrestor 20 reduces and incoming dc line voltage V1 correspondingly reduces. When surge arrester current I3 reaches zero, voltage V1 collapses to the same level as the voltage of the dc power source(s) from which fault current has been drawn and this has been annotated as 'Rated Vdc' for convenience in FIG. 4.

In the above description of the clearance of a load side short circuit, the line resistance and inductance between the circuit breaker and the short circuit were neglected and the incoming dc line voltage V1 is equivalent to the voltage across the fault-interrupting switch contact system 2. The load side circuit would in practice be inductively dominated, as for the dc transmission lines elsewhere in the multi-terminal HVDC network. As load side inductance increases, the inductive voltage drop between the circuit breaker and the short circuit increases and the voltage V1 correspondingly increases prior to line current interruption and correspondingly decreases during line current interruption. For a given total short circuit fault current limiting inductance, however, this inductance is distributed between incoming and outgoing dc lines and the behaviour and resultant current waveforms within the circuit breaker remain un-affected. The insulation system of the outgoing dc line must be able to accommodate this form of transient voltage reversal. In the same way that outgoing dc line voltage drop affects the incoming dc line voltage V1 then other load side voltage circumstances may affect the voltage V1 and the case where the circuit breaker is opened when a fault is not present is now described.

If the circuit breaker is called upon to interrupt normal load current then the dc line voltage is the sum of the surge arrester knee-point voltage and slope resistance voltage drop and the load voltage. The incoming dc line voltage V1 may be excessive in these circumstances and an additional surge arrester 26a may optionally be connected between the incoming dc line 8 and ground reference 28 in order to more effectively limit dc line voltage. In this case the knee-point voltage of the additional surge arrester 26a is selected to be only slightly greater than normal working dc line voltage and the additional surge arrester slope resistance voltage drop is relatively low. The maximum voltage that is impressed upon the dc line 6 during circuit breaker operation under load interruption conditions is set by the additional surge arrester characteristics. The additional surge arrester 26a is connected to the incoming dc line 8 (i.e. the dc transmission line of the multi-terminal HVDC network that sources the load current) and is only effective when line current is in a first polarity. A further additional surge arrester 26b may optionally be connected between the outgoing dc line 10 and ground reference 28 and is effective in limiting outgoing dc line voltage when dc line current is in a second polarity. When an additional surge arrester 26a, 26b is employed and a load side short circuit fault current is interrupted, the surge arrester 20 and the additional surge arrester are effectively connected in parallel since their respective slope resistance voltage drops are substantially greater than the voltage drops in the interconnecting inductances and rectifier string diode voltage drops and the surge energy rating of the respective surge arresters may be selected on the basis that their total dissipation is shared. Irrespective of how many surge arresters are used as part of the switching aid network, the commutation of current from the snubber string 14 to a single surge arrester or two (or more) surge arresters is governed by the same process wherein the rate of commutation is determined by the commutating inductance and the slope resistance of the surge arrester(s) and the end of the commutation is caused by the completion of reverse recovery in the thyristors T1 . . . Tn of the snubber string 14. The commutating inductance and slope resistance both reduce when two (or more) surge arresters share the dissipation.

Figure 3:
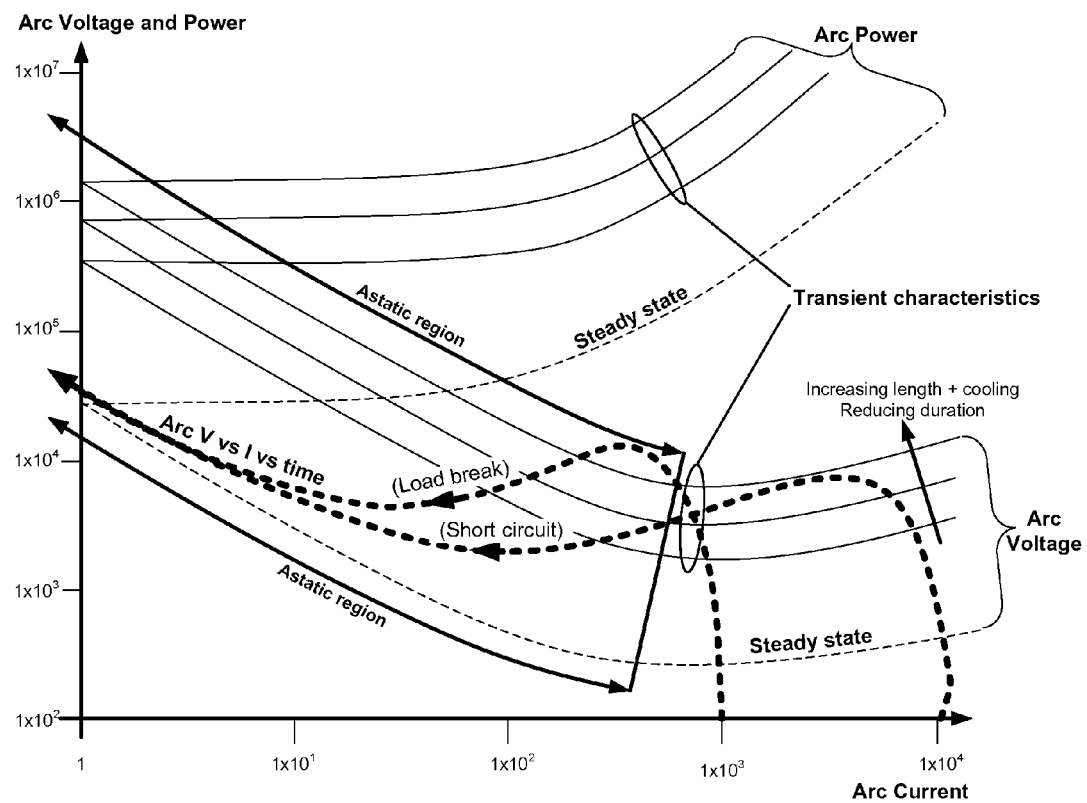
FIG. 3 is a diagram showing arc voltage, arc power and arc current characteristics showing arc behaviour.
Figure 4:
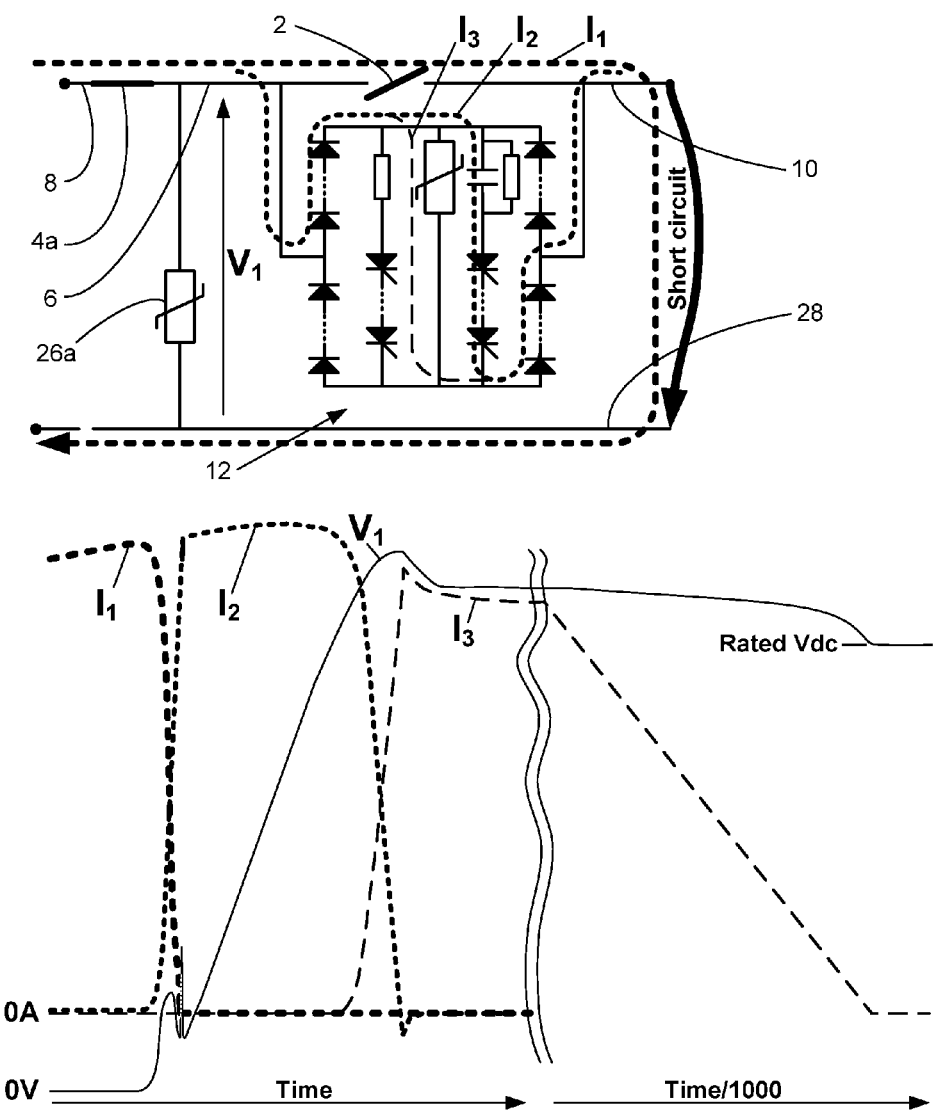
FIG. 4 is a diagram showing voltage and current characteristics when the circuit breaker of FIG. 2 interrupts a load side short circuit fault according to the present invention.
Figure 5:
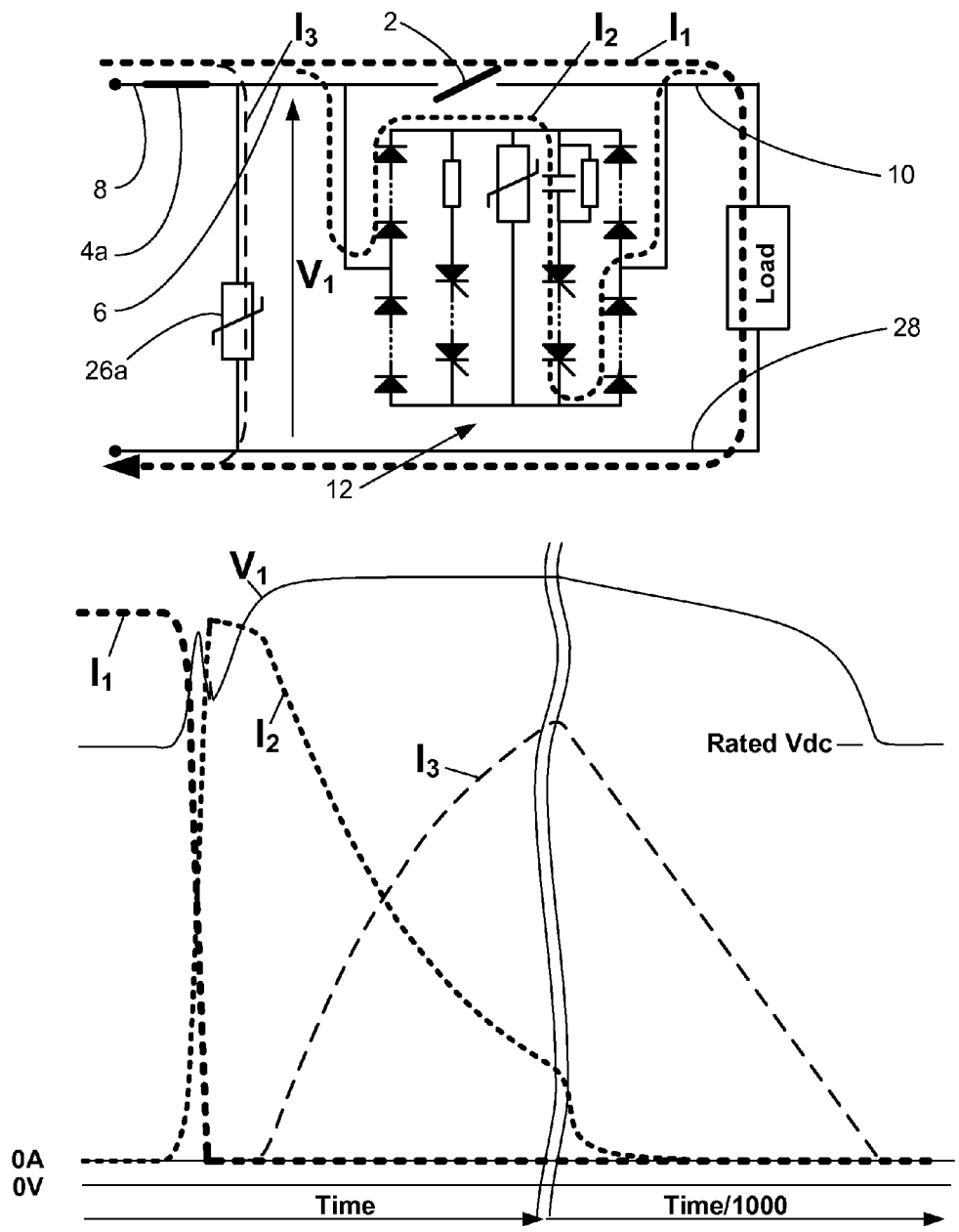
FIG. 5 is a diagram showing voltage and current characteristics when the circuit breaker of FIG. 2 interrupts a normal load fault according to the present invention.

The situation where the circuit breaker interrupts a normal load fault is shown in FIGS. 3 and 5. As in FIG. 4, current paths are annotated on the circuit diagram using three weights of dashed lines that correspond to the line type used in the current waveform shown in the diagram immediately below. In this case, the optional surge arrester 26a between the incoming dc line 8 and the ground reference 28 limits transient voltages that are applied between the circuit breaker contacts and the incoming dc line. The operation of the circuit breaker is otherwise broadly as described with reference to FIGS. 3 and 4 and it is only necessary to describe the differences between the waveforms of FIGS. 4 and 5 to gain the necessary understanding of load interruption. Prior to opening the fault-interrupting switch contact system 2, incoming dc line voltage V1 is constant at rated Vdc and incoming dc line current is constant at the exemplary level of 1×103 A indicated in FIG. 3. When the contact tips part an arc is formed and arc voltage is immediately sufficient to cause a progressive reduction in load current. Since arc current is much less than in the case of short circuit fault interruption, the extent of thermal ionisation in the arc is also much less and the arc voltage is therefore greater, as shown in the trace annotated 'Arc V vs I vs time (Load break)' in FIG. 3. The presence of arc voltage immediately causes the incoming dc line voltage V1 to increase beyond rated conditions whilst arc voltage is considerably less than Rated Vdc. The abrupt conclusion of commutation of arc current I1 into the snubber string current I2 is evident but the corresponding incoming dc line voltage V1 spike is less evident in FIG. 5 than in FIG. 4 as a result of the additional moderation of transient voltage caused by the presence of the intrinsic capacitance of the optional surge arrester 26a that is connected between the incoming dc line 8 and ground conductor 28. The load current reduces far more rapidly than does the current in the case of a short circuit fault because load resistance and arc voltage both oppose the passage of load current. This more rapid reduction in load current is evident in the trace of the snubber string current I2 in FIG. 5 and the increase in surge arrester current I3 is correspondingly reduced, noting that current I3 now flows in the optional surge arrester 26a and that the current in the surge arrester 20 of the switching aid network 12 is minimal. Since the load current to be interrupted is less than the short circuit fault current it follows that the energy that is dissipated in the optional surge arrester 26a is less than that in surge arrester 20 during short circuit fault conditions.

Robust, pressure contact, bipolar power electronic devices are used throughout and the thyristors T1 . . . Tn benefit from a regenerative structure that minimises low power losses during conduction and the presence of pole pieces that limit the transient junction temperature rise and thermo-mechanically induced stresses within the device body or wafer. The use of a naturally commutated switching aid network 12 is beneficial because the specified power electronic devices turn off by the well-known and robust process of reverse recovery wherein current switching occurs at a low current following a natural current reversal and hence a low turn off switching stress is incurred. The thyristors T1 . . . Tn have low turn on switching stress despite having low gate drive power requirements, thereby permitting the use of a simple and efficient gate drive system. These pressure contact devices inherently have an ability to operate in a series redundant mode wherein one of more device or gate drive system failures may be tolerated without affecting the functionality of their respective string.

The pre-charge sequence occurs in two stages. When an incoming dc line is energised at normal working voltage, the fault-interrupting switch contact system 2 of the circuit breaker is open and an outgoing dc line 10 is to be energised, the first phase of the pre-charge function is initiated by turning on the thyristors T1 . . . Tn in the pre-charge string 18 by gate control. Current will flow from the incoming dc line 8 to the outgoing dc line 10 through the rectifier strings 16a, 16b and the pre-charge string 18, the magnitude of the current being set by the resistor R1 in the pre-charge string and the difference between incoming and outgoing dc line voltages. The outgoing dc line 10 and the load that is connected to the outgoing dc line are dominantly capacitive and initially the outgoing dc line voltage increases exponentially whilst current reduces exponentially. In practice the load impedance may include a parallel connected high resistance term and thus the outgoing dc line voltage asymptote may be less than the incoming dc line voltage. The second stage of the pre-charging sequence is initiated by turning on the thyristors T1 . . . Tn in the snubber string 14 by gate control, it being the case that the voltage across the capacitor C1 in the snubber string is substantially zero prior to turning on the thyristors, and after which a damped resonant capacitor charging current flows in the snubber string 14 and the outgoing dc line 10 for a half cycle. Since the capacitor C1 in the snubber string 14 is then effectively connected in parallel with the pre-charge string 18, the current in the thyristors T1 . . . Tn in the pre-charge string 18 reduces rapidly and at a rate that is significantly greater than the rate of increase of the current in the thyristors T1 . . . Tn in the snubber string. The rate of reduction of current in the pre-charge string 18 is determined by the inductive-resistive time constant (L/R) of the pre-charge resistor R1 and the collapse of current I1 has been shown for the preferred case where the stray inductance of the resistor is minimal and its L/R time constant is minimal. In this case the thyristors T1 . . . Tn in the pre-charge string 18 turn off as a result of their anode current reducing below their holding current. It is equally applicable to design the pre-charge resistor R1 to have a sufficiently large L/R time constant for its current to decay slowly and for the reverse recovery of the thyristors T1 . . . Tn in the pre-charge string to occur at, or shortly after, the end of the damped resonant half cycle. This slow decay in practice would have minimal effect upon the resonant current. The end of this half cycle is caused by the reverse recovery of the thyristors T1 . . . Tn in the snubber string 14. The action of the reverse recovery of the thyristors T1 . . . Tn in the snubber string 14 is initially such as to cause the voltage between the dc output terminals 24a, 24b of the H-bridge rectifier to reverse and for this to finally cause the current in the thyristors T1 . . . Tn in the pre-charge string 18 to momentarily reverse, then to fall to zero, and for the thyristors to turn off as a result of their reverse recovery if they have not already turned off as a result of their current reducing below their holding current level. At the end of the second stage of the pre-charge cycle the outgoing dc line 10 is left over-charged to a small extent that is determined by selection of the point in time when the thyristors T1 . . . Tn in the pre-charge string 18 are fired and also the damping factor during the second phase of the pre-charge cycle. The damped resonant nature of the second stage of the pre-charge sequence also causes the diodes D1 . . . Dn in the rectifier strings 16a, 16b to be commutated by reverse recovery. The fault-interrupting switch contact system 2 may be closed at a suitable time when the voltage across it is sufficiently low as to limit the subsequent magnitude of current inrush. In practice, the respective points in time at which the thyristors T1 . . . Tn in the pre-charge string 18 are turned on and the contacts of the fault-interrupting switch contact system 2 are closed may be optimised to minimise line current inrush following switch contact system closure. The closure of the fault-interrupting switch contact system finally ensures that all power electronic devices revert to their off state.

Figure 6:
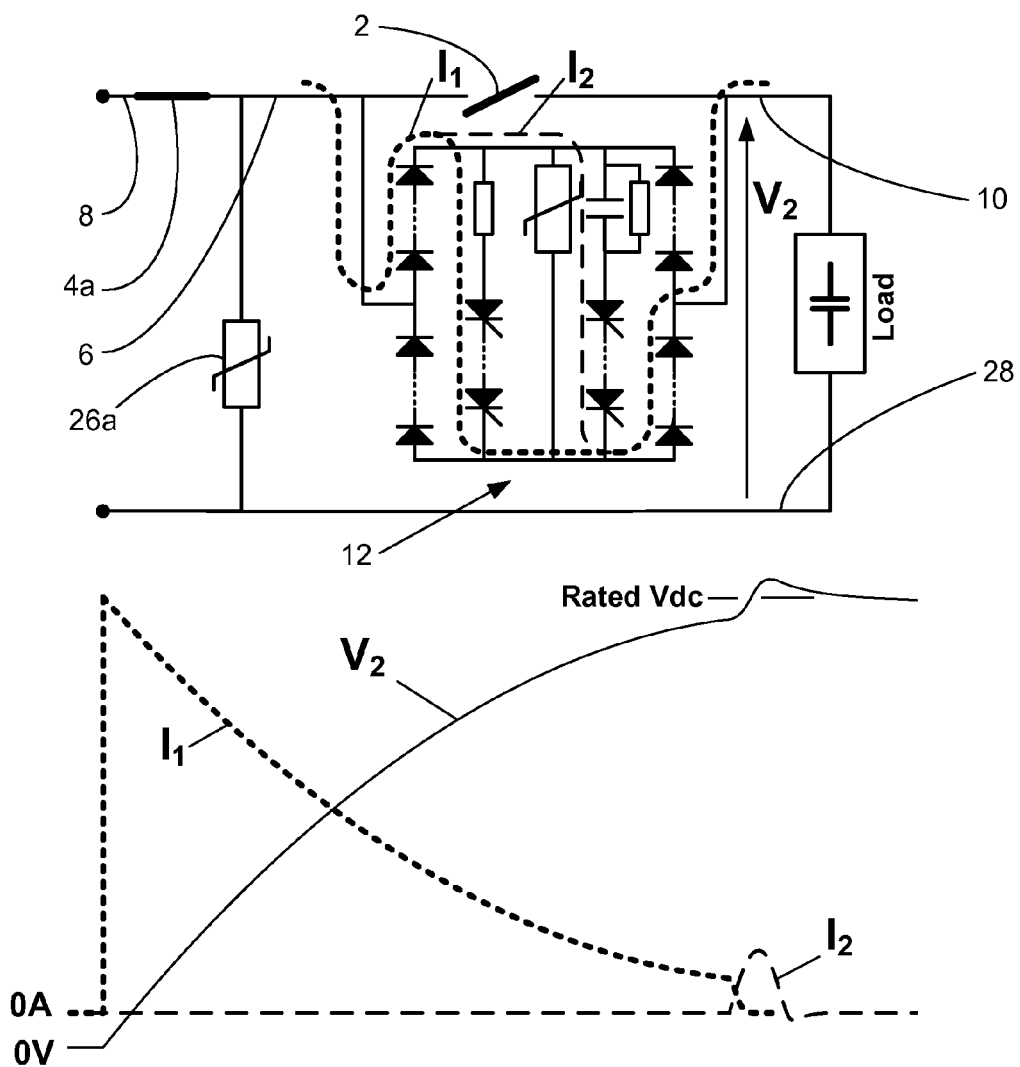
FIG. 6 is a diagram showing voltage and current characteristics when the circuit breaker of FIG. 2 pre-charges a load circuit according to the present invention.

FIG. 6 shows the current waveforms when pre-charging for the situation where the snubber capacitor C1 is fully discharged prior to the pre-charge event and when the second stage damping factor is low and when the snubber string 18 is turned on sufficiently early to cause the outgoing dc line voltage V2 to overshoot rated Vdc. Prior to turning on the thyristors T1 . . . Tn of the pre-charge string 18 these devices are forward biased (anode positive with respect to cathode) and the corresponding gate driver units have detected that it is safe to turn on the thyristors as soon as the circuit breaker controller provides a turn on request command signal 46. The circuit breaker controller 30 receives an operator command in the form of an input signal 38 from the operator interface (not shown) to energise the outgoing dc line 10 and immediately requests the thyristors T1 . . . Tn in the pre-charge string 18 to turn on. The thyristors T1 . . . Tn turn on and current I1 rapidly increases in the thyristors. The pre-charge resistor R1 defines pre-charge current and inherently includes some stray inductance which is beneficial to the turn on process of the thyristors T1 . . . Tn. The timebase in FIG. 6 is insufficient to show the effect of this stray inductance upon thyristor di/dt and this trace appears as a vertical edge which rises to the level that is defined by the resistance of the pre-charge resistor R1. Thereafter, current I1 reduces and voltage V2 increases exponentially with a time constant defined by the pre-charge resistor R1 and the capacitance of the outgoing dc line 10 and connected load circuit. During the exponential charging of the load side capacitance, the bleed resistor R2 that is connected across the capacitor C1 in the snubber string 14 causes the voltage across this capacitance to remain at substantially zero voltage, the thyristors T1 . . . Tn of the snubber string 14 are forward biased (anode positive with respect to cathode) in the off state and the corresponding gate driver units have detected that it is safe to turn on the thyristors as soon as the controller 30 provides a turn on request command signal 44. By sensing the difference between incoming dc line voltage V1 and outgoing dc line voltage V2, the controller 30 is able to monitor the exponential pre-charging process which defines that voltage V2 becomes asymptotic at a voltage that is slightly less than the desired final voltage which is defined as Rated Vdc. The circuit breaker controller 30 determines that the thyristors T1 . . . Tn in the snubber string 14 shall be turned on when the dc outgoing line voltage V2 approaches this asymptotic level and then provides the turn on command signal 44 to the gate driver units of the thyristors in the snubber string. The thyristors T1 . . . Tn in the snubber string 14 turn on and a resonant circuit is formed comprising: the incoming dc line power supply network, the rectifier strings 16a, 16b, the snubber string 14 (dominated by the capacitor C1 whose voltage has been maintained at substantially zero), and the outgoing dc line and load network. The pre-charging function is most important when the outgoing dc line and load network is dominated by capacitance since a large inrush current would flow if the fault-interrupting switch contact system 2 was closed whilst outgoing dc line voltage V2 was at a substantially lower level than the incoming dc line voltage V1. Accordingly, FIG. 6 depicts this case and the damping factor of the resonant circuit is low. If the outgoing dc line and load network is dominated by resistance, a relatively small inrush current would flow if the fault-interrupting switch contact system 2 was closed whilst outgoing dc line voltage V2 was at a substantially lower level than the incoming dc line voltage V1 and the damping factor of the resonant circuit would be high. In the case of the capacitively dominated load network the damping factor is low and hence FIG. 6 shows a snubber string current I2 transient that is approximately a half sinusoid whilst dc output line voltage V2 overshoots incoming dc line voltage V1 (at Rated Vdc). This overshoot closely corresponds with the degree by which the outgoing dc line voltage V2 was less than the incoming dc line voltage V1 at the time when the thyristors T1 . . . Tn of the snubber string 14 were turned on. The reverse recovery of the thyristors T1 . . . Tn in the snubber string 14 prevents the resonance from continuing. Thereafter the inherent leakage resistance presented by the load circuit causes outgoing dc line voltage to decay. By sensing the difference between incoming dc line voltage V1 and outgoing dc line voltage V2, the circuit breaker controller 30 is able to monitor this decay and provides a trigger signal 40 to instruct the fault-interrupting switch contact system 2 to close at the point when voltage V2 is approximately equal to voltage V1, thereby causing minimal inrush current to flow and, more importantly, completely avoiding the risk of pre-strike damage to the contact tips of the switch contact system. The criticality of pre-strike damage to the contact tips cannot be over-stressed since this form of damage has a potentially all-important bearing on arc electrode behaviour wherein electrode surface defects can lead to the ejection of metal vapour into the arc, this being a source of conductive plasma that may dominate over the normally dominant mechanism of thermal ionisation and may potentially render re-combination of plasma ineffective in promoting arc extinction.

As mentioned above, isolating switch contact systems 4a, 4b optionally may be inserted between the dc line 6 of the circuit breaker and one or both of the incoming and outgoing dc lines 8, 10 in order to provide a high reliability, high resistance, high surge voltage and steady state isolation function. In most practical applications it would be considered inappropriate to rely on the naturally commutated off states of the thyristors in the switching aid network to provide isolation between the incoming and outgoing dc lines 8, 10. The actuation of the isolating switch contact systems 4a, 4b is synchronised with respect to that of the fault-interrupting switch contact system 2 and the gate control of thyristors such that the isolating switch contact system closure occurs immediately before turning on the pre-charge thyristors T1 . . . Tn and isolating switch contact system opening occurs immediately after the point in time when surge arrester current decays to zero and incoming dc line voltage settles at normal working level following a circuit breaker opening operation. When isolating switch contact systems 4a, 4b are inserted in both of the incoming and outgoing dc lines 8, 10 they may be opened substantially simultaneously and closed substantially simultaneously in response to trigger signals 42a, 42b. The isolating switch contact systems 4a, 4b may additionally be opened either substantially simultaneously or independently in response to a local or remotely generated operator command at any required time providing actions have previously been taken by the operator to cause the incoming and outgoing dc line currents to be reduced to zero beforehand.

Safety earthing switches 50a, 50b are provided to enable incoming and outgoing dc lines 8, 10 to be earthed to allow maintenance and repair operations to be performed.

As explained briefly above, the bleed resistor R2 is connected in parallel with the snubber string capacitor C1 in order to safely discharge the capacitor before maintenance and repair operations are performed. It is also essential that this capacitor C1 is substantially fully discharged prior to opening the fault-interrupting switch contact system 2 of the circuit breaker. It is preferable that the isolating switch contact systems 4a, 4b are not closed any earlier than is absolutely necessary prior to pre-charging operation since a small amount of leakage current passes through the thyristors T1 . . . Tn in the snubber string 14 whenever the dc terminal voltage of the H-bridge rectifier is present and this leakage current causes the capacitor C1 in the snubber string to slowly charge up. It is expected and acceptable for this capacitor charging to occur in a controlled manner because the time integral of the leakage current in the period following isolating switch contact system closure and during the subsequent exponential decay of the voltage between the incoming and outgoing dc lines 8, 10 will be small.

Although the design and operation of the circuit breaker 1 has been described in the context of a ground referenced or asymmetric monopole configuration, it will be readily appreciated that the same circuit breaker can be adapted for symmetrical monopole operation by removal of the earth connections and by adding suitable earthing safety switches. For convenience, the above description has not specified the polarity of the dc voltage on the incoming and outgoing dc lines 8, 10 and the circuit breaker of the present invention is equally applicable to both polarities.

Figure 7:
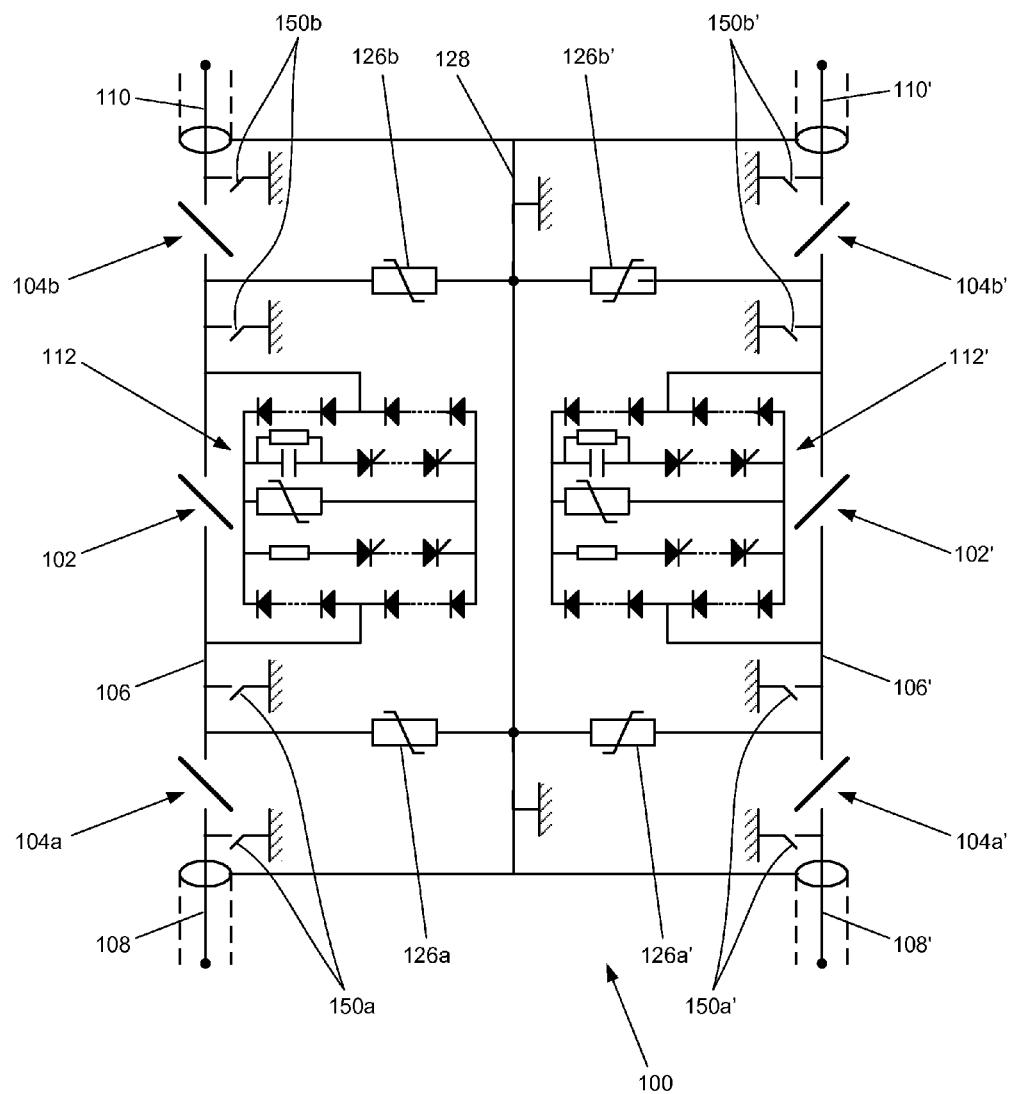
FIG. 7 is a schematic view of a second circuit breaker according to the present invention.

The circuit breaker can also be adapted for asymmetrical and symmetrical bipole line operation. With reference to FIG. 7, a second circuit breaker 100 includes a first dc line 106 connected between a first incoming dc line 108 and a first outgoing dc line 110 by optional isolating switch contact systems 104a, 104b, and a second dc line 106' connected between a second incoming dc line 108' and a second outgoing dc line 110' by optional isolating switch contact systems 104a' and 104b'. The first dc line 106 includes a first fault-interrupting switch contact system 102 and the second dc line 106' includes a second fault-interrupting switch contact system 102'.

A first switching aid network 112 has input dc terminals connected to the first dc line 106 and a second switching aid network 112' has input dc terminals connected to the second dc line 106'. Both of the switching aid networks 112, 112' are identical to the switching aid network 12 shown in FIG. 2 and need not be described further.

Additional surge arresters 126a, 126b and 126a', 126b' may optionally be connected between the first and second dc lines and a common ground reference 128.

Earthing switches 150a, 150b are connected to the first dc line 106 and earthing switches 150a', 150b' are connected to the second dc line 106'.

The circuit breaker 100 of FIG. 7 operates in the same manner as the circuit breaker 1 shown in FIG. 2 under load side short circuit, normal load interruption, and during pre-charging of the outgoing dc lines.

The first and second fault-interrupting switch contact systems 102, 102' can be operated independently with independent controllers (not shown) and with each circuit breaker behaving as if it were an independent asymmetric monopole system. However, the fault-interrupting switch contact systems 102, 102' can optionally be operated in a synchronised manner. For example, a symmetrical bipole network may be configured so as to normally operate as a symmetrical monopole with balanced currents flowing in positive and negative side lines and no earth conductor current, asymmetric monopole operation only being initiated as a reversionary operating mode following a failure in one side of the system. When operating symmetrically it would be preferable to open the fault-interrupting switch contact systems 102, 102' simultaneously in order to equalise the switching transients on both sides of the system. In this example the system designer may have simply chosen to re-deploy an existing benchmark modular design at twice benchmark transmission voltage by employing two such benchmark modules, in doing so the designer would naturally wish to provide the reversionary operating capability. In the case of synchronised operation, although it would be possible to employ a single common circuit breaker controller with twice the above-described controller functionality (i.e. with the ability to simultaneously provide trigger signals to both fault-interrupting switch contact systems etc.) and with an additional synchronisation function, the above-described reversionary operating mode would most reliably be provided by having two near independent controllers, each having the above-described functionality and with the addition of selectable bidirectional synchronisation signals which could be disabled in order to guarantee the desired degree of independence. In general it is preferable not to rely upon a single controller since that would constitute a single point failure mode. In fact, it would be normal in the industry to duplicate control equipment in each side of a HVDC transmission system and this may also be implemented within the scope of the present invention.

In another example, the principle of modularity could be extended by series connecting at least two circuit breakers, each having a benchmark current and voltage rating in order to provide the functionality of a single circuit breaker with 1 pu current rating and 2 pu voltage rating. In any case, a circuit breaker according to the present invention may employ series connected fault-interrupting switch contact systems, and any convenient number of power electronic devices (e.g. diodes, thyristors etc.) in the switching aid network(s) in order to satisfy voltage rating requirements, it being an inherent feature of the present invention that all series connected power electronic devices within a particular function are practically identical and are operated in a precisely synchronised manner. The principle of modularity may also be extended by parallel connection of at least two circuit breakers. Series, parallel and series-parallel derivatives of the above-described components and systems are considered to be within the scope of the present invention and are subject to an overriding requirement that all components of like function operate in a precisely synchronised manner and with balanced impedances, this requirement being defined so as to equalise switching stresses and other operating conditions.

The written description description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A circuit breaker comprising:
   a first dc line electrically connectable to first incoming and first outgoing dc lines, wherein the first dc line comprises a first fault-interrupting switch contact system comprising contacts; and
   a first switching aid network comprising:
      a first and a second rectifier string, wherein each rectifier string comprises one or more series connected reverse blocking power electronic devices that define a first H-bridge rectifier, wherein the H-bridge rectifier comprises first and second dc input terminals and first and second dc output terminals, wherein the first and second dc input terminals are connected to the first dc line in parallel with the first fault-interrupting switch contact system,
      a snubber string comprising at least one series connected power electronic devices capable of being turned on by gate control and a capacitor, wherein the snubber string is connected between the first and second dc output terminals of the first H-bridge rectifier,
      a pre-charge string comprising at least one series connected power electronic devices capable of being turned on by gate control and a resistor, wherein the pre-charge string is connected between the first and second dc output terminals of the first H-bridge rectifier, and
      a surge arrester connected between the first and second dc output terminals of the first H-bridge rectifier.

2. The circuit breaker according to claim 1, further comprising a resistor in parallel with the capacitor (of the snubber string of the first switching aid network.

3. The circuit breaker according to claim 1, wherein the switching aid network further comprises at least one additional surge arrester connected between the first dc line and a ground reference.

4. The circuit breaker according to claim 1, further comprising at least one earthing switch connected to the first dc line.

5. The circuit breaker according to claim 1, further comprising a first isolating switch contact system connected to the first dc line and electrically connectable to the first incoming dc line, wherein the first isolating switch contact system comprises contacts.

6. The circuit breaker according to claim 5, further comprising a second isolating switch contact system connected to the first dc line and electrically connectable to the first outgoing dc line, wherein the second isolating switch contact system comprises contacts.

7. The circuit breaker according to claim 1, further comprising a controller for opening and closing of the contacts of the fault-interrupting switch contact system.

8. The circuit breaker according to claim 5, further comprising a controller for opening and closing the contacts of the first isolating switch contact system and/or the second switch contact isolating system.

9. The circuit breaker according to claim 1, further comprising:
   a second dc line electrically connectable to second incoming and outgoing dc lines, wherein the second dc line comprises a second fault-interrupting switch contact system comprising contacts; and
   a second switching aid network comprising:
      a first and a second rectifier string, wherein each rectifier string comprises one or more series connected reverse blocking power electronic devices that define a second H-bridge rectifier, wherein the second H-bridge rectifier comprises first and second dc input terminals and first and second dc output terminals, wherein the first and second dc input terminals are connected to the second dc line in parallel with the second fault-interrupting switch contact system,
      a snubber string comprising at least one series connected power electronic devices capable of being turned on by gate control and a capacitor, wherein the snubber string is connected between the first and second dc output terminals of the second H-bridge rectifier,
      a pre-charge string comprising at least one series connected power electronic devices capable of being turned on by gate control and a resistor, wherein the pre-charge string is connected between the first and second dc output terminals of the second H-bridge rectifier, and
      a surge arrester connected between the first and second dc output terminals of the second H-bridge rectifier.

10. The circuit breaker according to claim 9, further comprising a resistor in parallel with the capacitor of the snubber string of the second switching aid network.

11. A method of interrupting fault current using a circuit breaker comprising a first dc line electrically connectable to first incoming and first outgoing dc lines, wherein the first dc line comprises a first fault-interrupting switch contact system comprising contacts; and
   a first switching aid network comprising:
      a first and a second rectifier string, wherein each rectifier string comprises one or more series connected reverse blocking power electronic devices that define a first H-bridge rectifier, wherein the H-bridge rectifier comprises first and second dc input terminals and first and second dc output terminals, wherein the first and second dc input terminals are connected to the first dc line in parallel with the first fault-interrupting switch contact system,
      a snubber string comprising at least one series connected power electronic devices capable of being turned on by gate control and a capacitor, wherein the snubber string is connected between the first and second dc output terminals of the first H-bridge rectifier,
      a pre-charge string comprising at least one series connected power electronic devices capable of being turned on by gate control and a resistor, wherein the pre-charge string is connected between the first and second dc output terminals of the first H-bridge rectifier, and
      a surge arrester connected between the first and second dc output terminals of the first H-bridge rectifier, the method comprising:
  actuating the fault-interrupting switch contact system so that the contacts open, causing an arc to be formed and wherein the switching aid network causes the arc to transit into and thereafter remain in an astatic region until it is extinguished.

12. The method of interrupting fault current according to claim 11, wherein the switching aid network limits the transient recovery voltage that is applied to the fault-interrupting circuit breaker switch contact system and dissipates inductive switching energy.

13. The method of interrupting fault current according to claim 11, wherein the switching aid network moderates line current and voltage transient whilst pre-charging the dc line prior to transmission of power.

14. The method of interrupting fault current according to claim 11, wherein during pre-charging the contacts of the fault-interrupting switch contact system are closed when the voltages in the incoming and outgoing dc lines are substantially equal.

15. The method of interrupting fault current according to claim 11, wherein a dielectric liquid or gas and/or the gaseous thermal decomposition phases of the dielectric liquid or gas flows between the contacts during actuation of the fault-interrupting switch contact system.

* * * * *